(12) United States Patent
Leggette et al.

(10) Patent No.: US 10,447,474 B2
(45) Date of Patent: Oct. 15, 2019

(54) DISPERSED DATA STORAGE SYSTEM DATA DECODING AND DECRYPTION

(75) Inventors: Wesley Leggette, Oak Park, IL (US); Jason K. Resch, Chicago, IL (US)

(73) Assignee: PURE STORAGE, INC., Mountain View, CA (US)

(*) Notice: Subject to any disclaimer, the term of this patent is extended or adjusted under 35 U.S.C. 154(b) by 1242 days.

(21) Appl. No.: 12/551,145

(22) Filed: Aug. 31, 2009

(65) Prior Publication Data

US 2010/0269008 A1    Oct. 21, 2010

Related U.S. Application Data

(63) Continuation-in-part of application No. 12/426,727, filed on Apr. 20, 2009, now Pat. No. 9,483,656.

(51) Int. Cl.
| | | |
|---|---|---|
| H04L 9/08 | (2006.01) | |
| G06F 11/10 | (2006.01) | |
| G06F 21/78 | (2013.01) | |
| H04L 1/00 | (2006.01) | |
| H04L 29/06 | (2006.01) | |

(Continued)

(52) U.S. Cl.
CPC ........ *H04L 9/0894* (2013.01); *G06F 11/1076* (2013.01); *G06F 21/78* (2013.01); *H04L 1/0057* (2013.01); *H04L 63/0428* (2013.01); *G06F 2221/2109* (2013.01); *H03M 13/15* (2013.01); *H03M 13/1515* (2013.01); *H03M 13/23* (2013.01); *H04L 2209/16* (2013.01); *H04L 2209/34* (2013.01); *H04L 2463/062* (2013.01)

(58) Field of Classification Search
CPC ... H04L 1/0045; H04L 1/0057; H04L 1/0061; H04L 1/0071; H04L 9/0894; H04L 63/0428; H04L 2209/34; H04L 2209/16; H04L 2463/062; G11B 20/18; G06F 21/78; G06F 11/1076; G06F 2221/2109; H03M 13/1515; H03M 13/15; H03M 13/23
USPC ......................................................... 714/746
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |

(Continued)

FOREIGN PATENT DOCUMENTS

EP    1107504 B1 *  3/2007

OTHER PUBLICATIONS

Shamir; How to Share a Secret; Communications of the ACM; vol. 22, No. 11; Nov. 1979; pp. 612-613.

(Continued)

*Primary Examiner* — Albert Decady
*Assistant Examiner* — Enam Ahmed
(74) *Attorney, Agent, or Firm* — Garlick & Markison; Timothy W. Markison; Kelly H. Hale

(57) ABSTRACT

A computing system retrieves securely stored encrypted and encoded data from a dispersed data storage system. The computing system includes a processing module and a plurality of storage units. The processing module includes an error decoder and a decryptor and to decode and decrypt the encrypted and encoded data retrieved from the dispersed data storage system utilizing a read command to the storage units. The storage units retrieve the encrypted and encoded data and send the encrypted and encoded data to the processing module when receiving the read command.

10 Claims, 25 Drawing Sheets

(51) Int. Cl.
*H03M 13/15* (2006.01)
*H03M 13/23* (2006.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,049,612 A * | 4/2000 | Fielder et al. | 380/44 |
| 6,058,454 A | 5/2000 | Gerlach et al. | |
| 6,128,277 A | 5/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,282,684 B1 * | 8/2001 | Kondo et al. | 714/752 |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,467,691 B1 * | 10/2002 | Green | 235/487 |
| 6,516,439 B2 * | 2/2003 | Kodama et al. | 714/758 |
| 6,530,055 B1 * | 3/2003 | Fukunaga | 714/746 |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,959,383 B1 * | 10/2005 | Terada | G06T 1/0021 358/3.28 |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,151,754 B1 * | 12/2006 | Boyce | H03M 13/1515 370/328 |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 7,734,915 B2 * | 6/2010 | Neill | G06F 21/72 713/165 |
| 8,036,133 B2 * | 10/2011 | Maheshwari | H04L 1/0041 370/235 |
| 8,201,262 B2 * | 6/2012 | Matsuo et al. | 726/27 |
| 8,266,463 B2 * | 9/2012 | Orsini et al. | 713/176 |
| 8,694,879 B1 * | 4/2014 | Peichl | H04L 1/0061 714/758 |
| 8,793,440 B2 * | 7/2014 | Miller | G06F 11/1435 711/141 |
| 8,850,214 B2 * | 9/2014 | Serret-Avila | G06T 1/0071 380/201 |
| 2002/0062422 A1 | 5/2002 | Butterworth et al. | |
| 2002/0166079 A1 | 11/2002 | Ulrich et al. | |
| 2002/0176578 A1 | 11/2002 | LaPat et al. | |
| 2003/0018927 A1 | 1/2003 | Gadir et al. | |
| 2003/0037261 A1 | 2/2003 | Meffert et al. | |
| 2003/0061623 A1 * | 3/2003 | Denney | H04L 12/2801 725/125 |
| 2003/0065617 A1 | 4/2003 | Watkins et al. | |
| 2003/0076542 A1 * | 4/2003 | Holcomb | H04N 1/00204 358/452 |
| 2003/0084020 A1 | 5/2003 | Shu | |
| 2004/0010742 A1 * | 1/2004 | Williamson | H03M 13/1515 714/746 |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0034454 A1 * | 2/2006 | Damgaard | H04L 9/302 380/28 |
| 2006/0047907 A1 | 3/2006 | Shiga et al. | |
| 2006/0116096 A1 * | 6/2006 | Proehl | 455/226.1 |
| 2006/0136448 A1 | 6/2006 | Cialini et al. | |
| 2006/0156059 A1 | 7/2006 | Kitamura | |
| 2006/0173926 A1 * | 8/2006 | Kornelson et al. | 707/200 |
| 2006/0224603 A1 | 10/2006 | Correll, Jr. | |
| 2007/0050849 A1 * | 3/2007 | Takashima | G06F 21/10 726/26 |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0283167 A1 | 6/2007 | Venters, III et al. | |
| 2007/0160146 A1 * | 7/2007 | Bright et al. | 375/240.16 |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2008/0052769 A1 * | 2/2008 | Leone | H04L 63/0272 726/7 |
| 2008/0090528 A1 * | 4/2008 | Malladi | 455/70 |
| 2008/0126805 A1 * | 5/2008 | Owlett et al. | 713/176 |
| 2008/0170696 A1 * | 7/2008 | Yoshimura | G06F 21/10 380/277 |
| 2008/0263363 A1 | 10/2008 | Jueneman et al. | |
| 2008/0310628 A1 | 12/2008 | Fujioka et al. | |
| 2009/0063923 A1 * | 3/2009 | Gower et al. | 714/746 |
| 2009/0094251 A1 | 4/2009 | Gladwin et al. | |
| 2009/0094318 A1 | 4/2009 | Gladwin et al. | |
| 2009/0327818 A1 * | 12/2009 | Kogelnik | G06F 11/1004 714/49 |
| 2010/0023524 A1 | 1/2010 | Gladwin et al. | |
| 2010/0199159 A1 * | 8/2010 | Isnardi | H03M 13/096 714/807 |
| 2010/0241924 A1 * | 9/2010 | Nishi | H03M 7/30 714/758 |
| 2011/0235721 A1 * | 9/2011 | Chen et al. | 375/240.25 |

OTHER PUBLICATIONS

Rabin, Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

(56) References Cited

OTHER PUBLICATIONS

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group, RFC 4512. Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Networking Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Lauritsen; Backups with Computational Secret Sharing; Master Thesis; Department of Computer Science, IT-Parken Katrinebjerg, University of Aarhus; Apr. 8, 2010; 81 pgs.

Kubiatowicz, et al.; OceanStore: An Architecture for Global-Scale Persistent Storage; Proceedings of the Ninth International Conference on Architectural Support for Programming Languages and Operating Systems (ASPLOS 2000), Nov. 2000, pp. 1-12.

\* cited by examiner computing system 10

FIG. 3
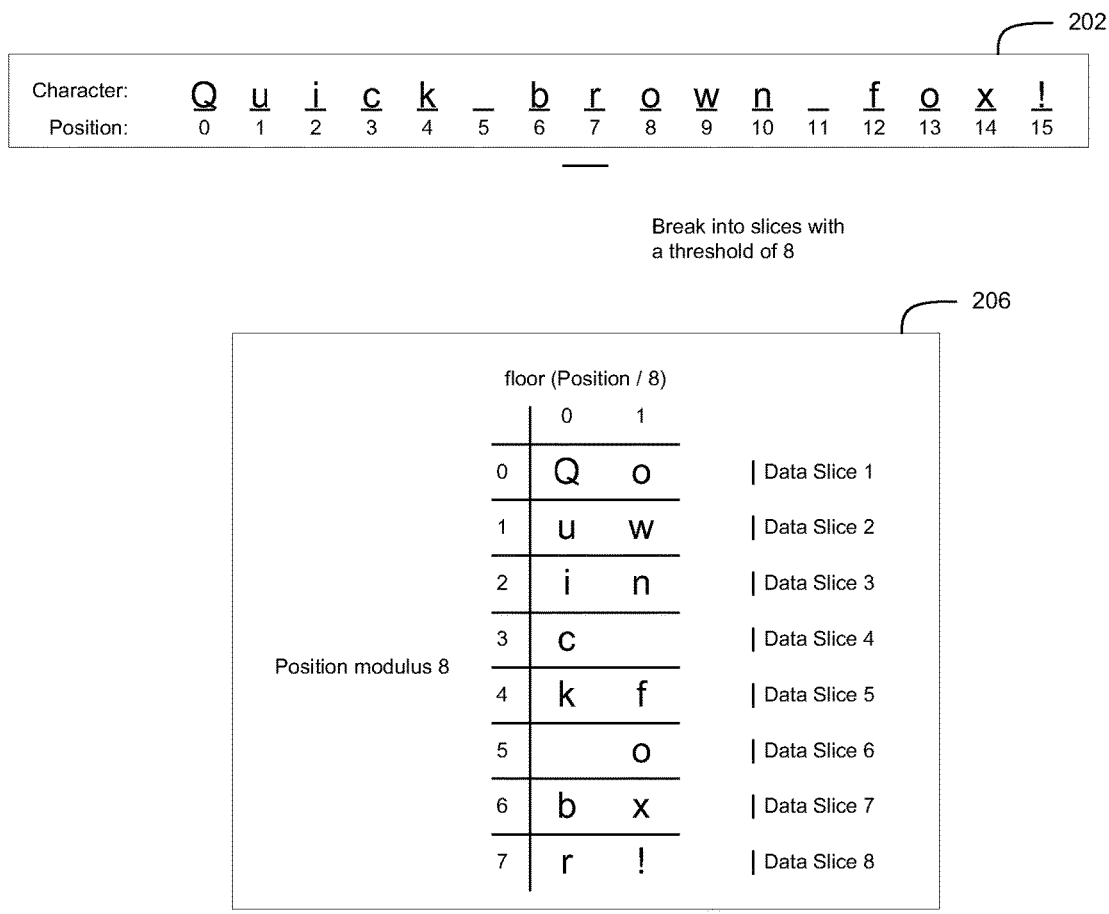
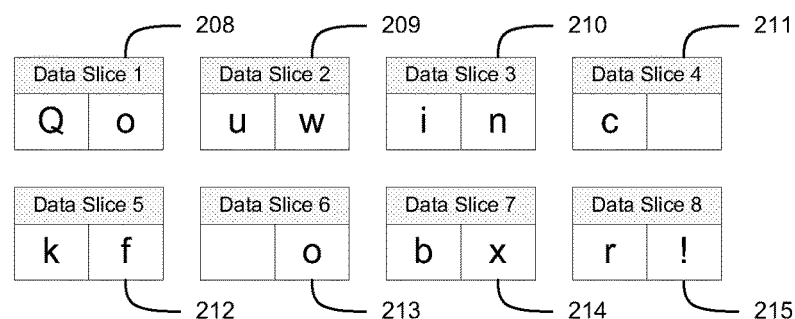

DISPERSED DATA STORAGE SYSTEM DATA DECODING AND DECRYPTION

CROSS-REFERENCE TO RELATED APPLICATIONS

This patent application is claiming priority under 35 USC § 120 as a continuation in part patent application of co-pending patent application entitled EFFICIENT AND SECURE DATA STORAGE UTILIZING A DISPERSED DATA STORAGE SYSTEM, having a filing date of Apr. 20, 2009, and a Ser. No. 12/426,727.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing and more particularly to storage of information.

Description of Related Art

Computing systems are known to communicate, process, and store data. Such computing systems range from wireless smart phones to data centers that support millions of web searches, stock trades, or on-line purchases every day. Computing processing is known to manipulate data from one form into another. For instance, raw picture data from an image sensor may be compressed, or manipulated, in accordance with a picture compression standard to produce a standardized compressed picture that can be saved or shared with others. Computer processing capability continues to advance as processing speed advances and software applications that perform the manipulation become more sophisticated.

With the advances in computing processing speed and communication speed, computers manipulate real time media from voice to streaming high definition video. Purpose-built communications devices, like the phone, are being replaced by more general-purpose information appliances. For example, smart phones can support telephony communications but they are also capable of text messaging, and accessing the internet to perform functions including email, web browsing, remote applications access, and media communications. Media communications includes telephony voice, image transfer, music files, video files, real time video streaming and more.

Each type of computing system is constructed, and hence operates, in accordance with one or more communication, processing, and storage standards. With such standards, and with advances in technology, more and more of the global information content is being converted into electronic formats. For example, more digital cameras are now being sold than film cameras, thus producing more digital pictures. High growth rates exist for web based programming that until recently was all broadcast by just a few over the air television stations and cable television providers. Digital content standards, such as used in pictures, papers, books, video entertainment, home video, all enable this global transformation to a digital format. Electronic content pervasiveness is producing increasing demands on the storage function of computing systems.

A typical computer storage function includes one or more memory devices to match the needs of the various operational aspects of the processing and communication functions. For example, a memory device may include solid-state NAND flash, random access memory (RAM), read only memory (ROM), a mechanical hard disk drive. Each type of memory device has a particular performance range and normalized cost. The computing system architecture optimizes the use of one or more types of memory devices to achieve the desired functional and performance goals of the computing system. Generally, the immediacy of access dictates what type of memory device is used. For example, RAM memory can be accessed in any random order with a constant response time. By contrast, memory device technologies that require physical movement such as magnetic discs, tapes, and optical discs, have a variable responses time as the physical movement can take longer than the data transfer.

Each type of computer storage system is constructed, and hence operates, in accordance with one or more storage standards. For instance, computer storage systems may operate in accordance with one or more standards including, but not limited to network file system (NFS), flash file system (FFS), disk file system (DFS), small computer system interface (SCSI), internet small computer system interface (iSCSI), file transfer protocol (FTP), and web-based distributed authoring and versioning (WebDAV). An operating systems (OS) and storage standard may specify the data storage format and interface between the processing subsystem and the memory devices. The interface may specify a structure such as directories and files. Typically a memory controller provides an interface function between the processing function and memory devices. As new storage systems are developed, the memory controller functional requirements may change to adapt to new standards.

Memory devices may fail, especially those that utilize technologies that require physical movement like a disc drive. For example, it is not uncommon for a disc drive to suffer from bit level corruption on a regular basis, or complete drive failure after an average of three years of use. One common solution is to utilize more costly disc drives that have higher quality internal components. Another solution is to utilize multiple levels of redundant disc drives to abate these issues by replicating the data into two or more copies. One such redundant drive approach is called redundant array of independent discs (RAID). Multiple physical discs comprise an array where parity data is added to the original data before storing across the array. The parity is calculated such that the failure of one or more discs will not result in the loss of the original data. The original data can be reconstructed from the other discs. RAID 5 uses three or more discs to protect data from the failure of any one disc. The parity and redundancy overhead reduces the capacity of what three independent discs can store by one third (n−1=3−2=2 discs of capacity using 3 discs). RAID 6 can recover from a loss of two discs and requires a minimum of four discs with an efficiency of n−2. Typical RAID systems utilize a RAID control to encode and decode the data across the array.

Drawbacks of the RAID approach include effectiveness, efficiency and security. As more discs are added, the probability of one or two discs failing rises and is not negligible, especially if more desired less costly discs are used. When one disc fails, it should be immediately replaced and the data reconstructed before a second drive fails. To provide high reliability over a long time period, and if the RAID array is part of a national level computing system with occasional site outages, it is also common to mirror RAID arrays at different physical locations. Unauthorized file access becomes a more acute problem when whole copies of the same file are replicated, either on just one storage system site or at two or more sites. In light of the effectiveness, the efficiency of dedicating 1 to 2 discs per array for the RAID overhead is an issue.

Therefore, a need exists to provide a data storage solution that provides more effective timeless continuity of data, minimizes adverse affects of multiple memory elements failures, provides improved security, can be adapted to a wide variety storage system standards and is compatible with computing and communications systems.

BRIEF DESCRIPTION OF THE SEVERAL VIEWS OF THE DRAWING(S)

FIG. 3 is an illustration of the principles of transposition as applied to a dispersed data storage system;

DETAILED DESCRIPTION OF THE INVENTION

Figure 1:
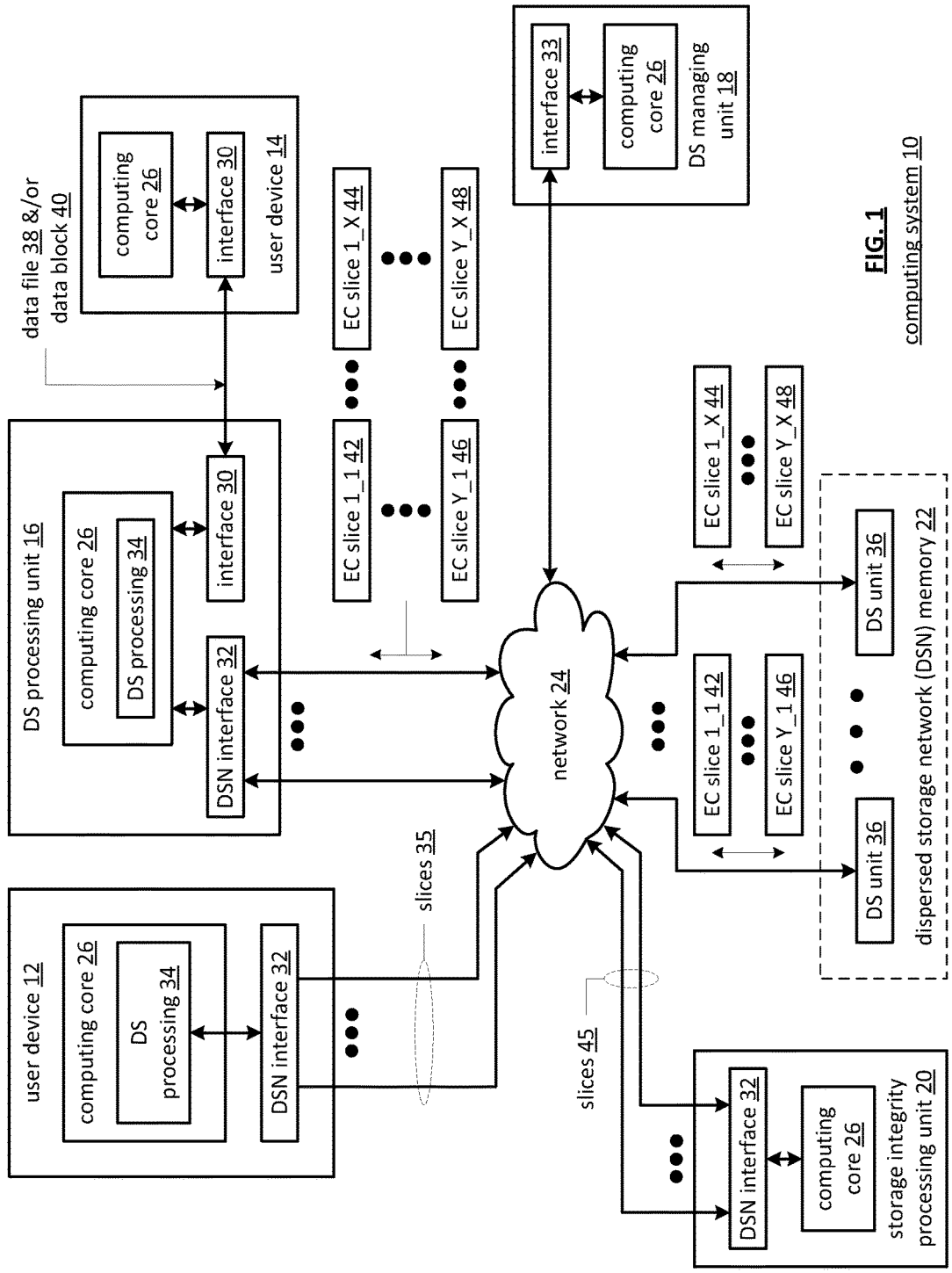
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-25.

Each of the user devices 12-14, the DS processing unit 16, the DS managing unit 18, and the storage integrity processing unit 20 may be a portable computing device (e.g., a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs the distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12 14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a threshold value (e.g., the minimum number of slices required to reconstruct the data segment).

As another example, the DS managing module 18 may create and store locally or within the DSN memory 22 user profile information. The user profile information includes one or more of authentication information, permissions, and/or the security parameters. The Security parameters may include one or more of encryption/decryption scheme, one or more encryption keys, key generation scheme, and data encoding/decoding scheme.

As yet another example, the DS managing unit 18 may create billing information for a particular user, user group, vault access, public vault access, etc. For instance, the DS managing unit 18 may track the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 may receive and aggregate network management alarms, alerts, errors, status information, performance information, and messages from the devices 12-14 and/or the units 16, 20, 22. For example, the DS managing unit 18 may receive a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 may determine that the DSN memory 22 needs more DS units 36 or that one or more of the DS units 36 needs updating.

The second primary function of distributed data storage and retrieval function begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon. The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-25.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encoded and slices the data file and/or data block it has to store. The device then transmits the slices 35 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45 of a data file or data block of a user device to verify that one or more slices has not be corrupted or lost (e.g., the DS storage unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
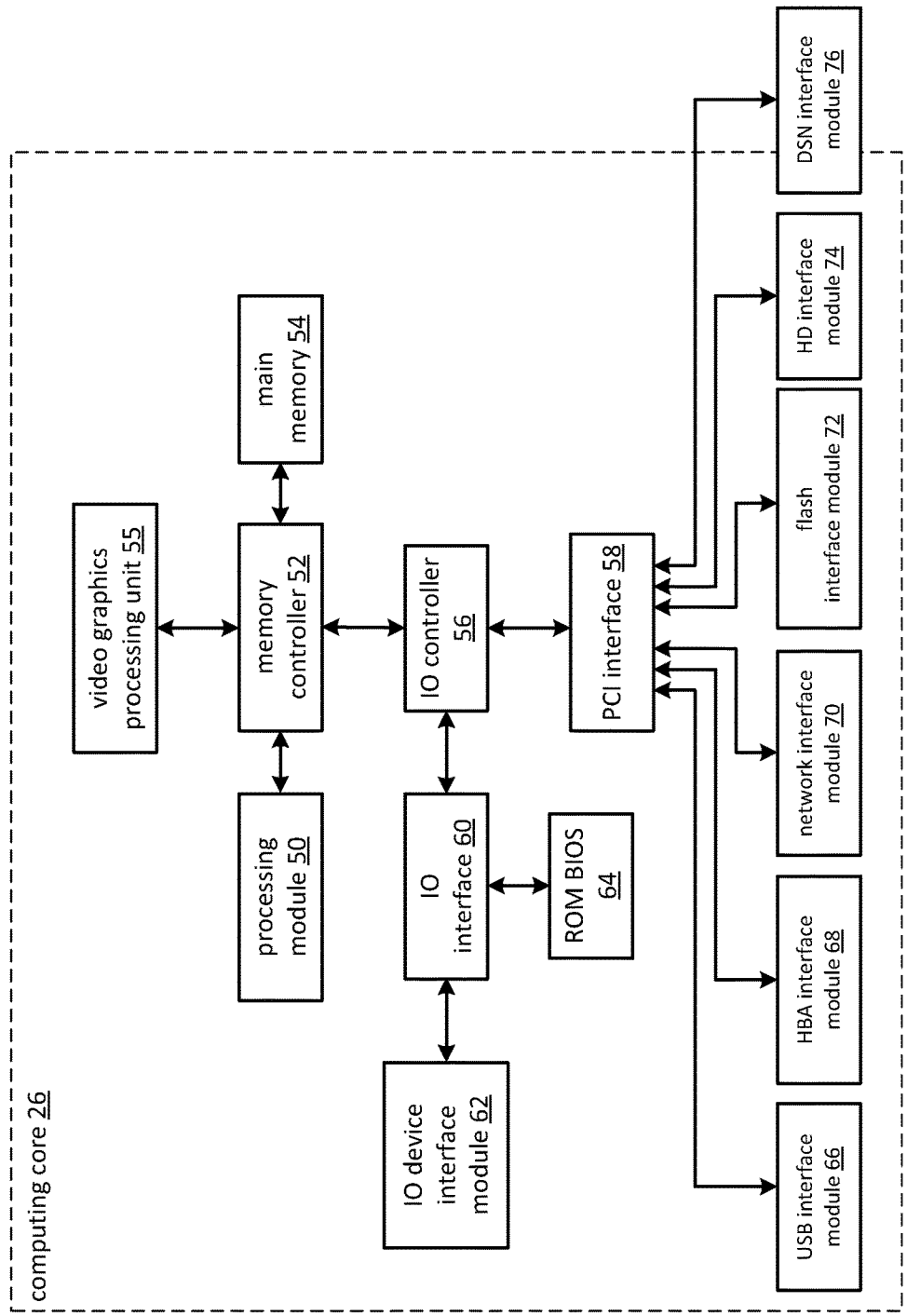
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as 10 ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-25.

FIG. 3 presents an overview of a process to secure a data segment in accordance with an embodiment of the disclosed invention. A data segment 202 is comprised of 16 bytes of ASCII data expressing the phrase "Quick brown fox!" It should be noted that the type of encoding of the data, as well as the size of a data unit, is irrelevant to the invention. Therefore, Unicode instead of ASCII could be used to encode the phrase, and the size of a data unit could be set to word (16 bits), double word (32 bits), or any other size. Furthermore, a data segment could be 32 bytes, 48 bytes, etc.

Where a higher level of security is required, the data segment 202 can be encrypted using an appropriate block cipher, such as DES or AES. While the use of encryption will increase security for the data storage system, it will also increase processor load on computers accessing the storage system. Accordingly, the performance of the system will be lowered, as computers writing data to the dispersed data storage system will need to encrypt data prior to writing it out, and systems reading data will likewise need to decrypt data. For those systems where high performance is more important than high security, the system administrator can elect to disable encryption. In this case, a moderate level of security is still attained by the disclosed system through the use of transposition, as explained below.

Regardless of whether the data segment is encrypted or not, the data within the data segment is arranged in a matrix 206. The matrix 206 is sized so that (1) every element of the data segment is assigned to a particular matrix entry, and (2) the number of data slices created is a multiple of the number of data slices created per data segment. In the depicted example, which assumes that eight data slices are created per data segment, an 8×2 matrix is used to fit the 16 data unit data segment, with the data segment arranged sequentially along the columns.

The data is then dispersed into data slices 208-215, each containing one row of data. As depicted, each data slice 208-215 contains entirely non-consecutive data from the original data segment.

A variety of sizes of matrices can be used to achieve many of the advantages of the disclosed system. For example, for a 16 byte data segment being stored on a system that slices data into 4 data slices, a 4×4 matrix could be used; data could be arranged along either the rows or columns, with the other serving as the basis for the data slices. However, while such an arrangement would increase security for the stored information, as no consecutive data units would be stored in a single slice, the optimal increase in security is achieved by sizing the matrix so that one dimension of the matrix, rows or columns, is equal to the threshold of the dispersed data storage network. For example, in an eight slice system, where the data segment size is set to 16 bytes, an 8×2 matrix could be used as described above. In this case, if a malicious hacker should recover two consecutive slices, a minimal number of consecutive data units will be recovered, i.e., two strips of data, each two data units in length.

Persons of skill in the art will realize that the decision to arrange data along the columns of the matrix is an arbitrary decision. For example, a 2×8 matrix could be used, and data could be arranged along the rows, instead of the columns. The data slices would then be made from the columns.

Figure 4:
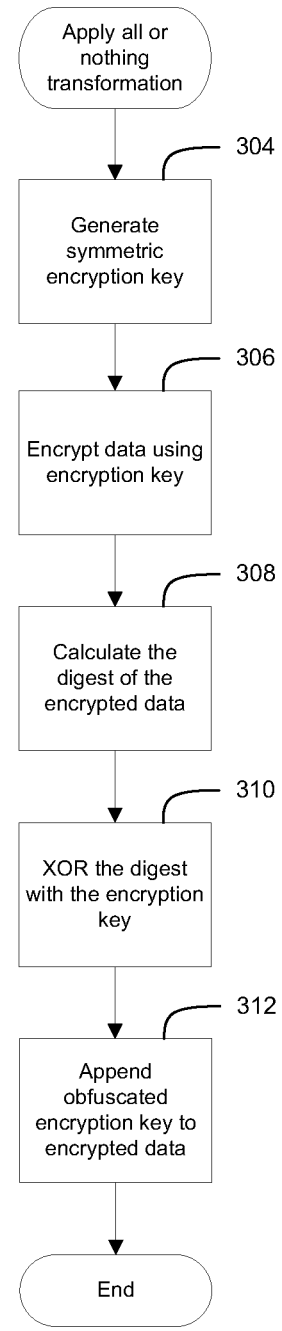
FIG. 4 is a flowchart illustrating the application of an all-or-nothing transformation to a data segment.

FIG. 4 depicts a method for applying an all-or-nothing transformation to a data segment. In a first step 304, a symmetric encryption key is generated. In step 306, the data segment is encrypted using the generated encryption key. In step 308, the digest of the encrypted data is calculated, by applying a hashing algorithm to the data segment; suitable hashing algorithms include MD5, SHA-1, SHA-2, and any other secure cryptographic hashing algorithm. The digest is then XOR-ed with the encryption key in step 310, and the obfuscated encryption key is appended to the data segment in step 312. From this process, it is apparent that the encryption key generated in step 304 is not "secret information," as it will be appended to the data with trivial protection.

Figure 5:
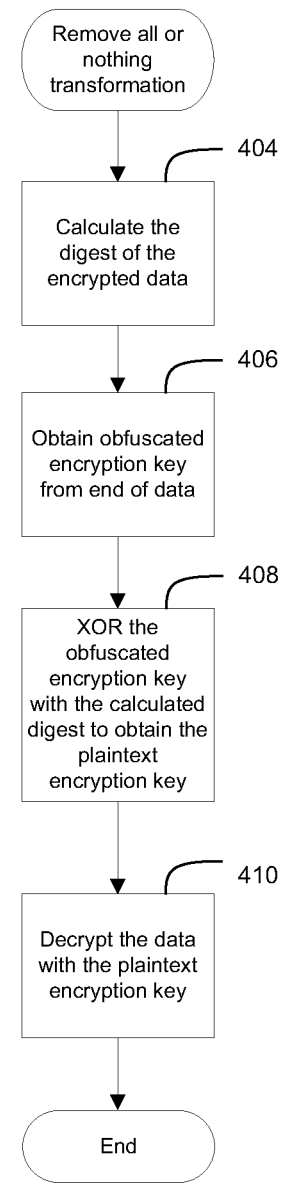
FIG. 5 is a flowchart illustrating the removal of an all-or-nothing transformation from a data segment.

FIG. 5 depicts a method for removing an all-or-nothing transformation from a data segment. In step 404, the digest of the encrypted data is calculated; note that the obfuscated digest placed at the end of the data segment in the method of FIG. 3 is not included in this calculation. In step 406, the obfuscated encryption key is read into a memory location, or otherwise obtained, and in step 408, the digest is XOR-ed with the obfuscated encryption key to obtain the plaintext encryption key. Finally, in step 410 data segment is decrypted with the encryption key.

Figure 6:
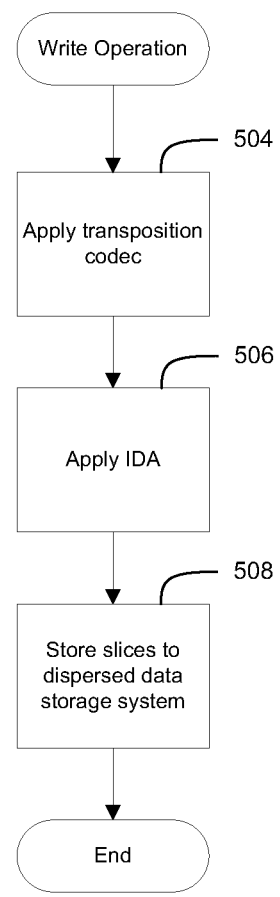
FIG. 6 is a flow chart illustrating a write operation to a dispersed data system utilizing a columnar transposition cipher and an information dispersal algorithm.

FIG. 6 depicts the steps required to write data from an access computer or an integrated client to a dispersed data storage system in accordance with a first embodiment of the disclosed invention. In step 502 a write operation is initiated. The initiation of the write operation involves accepting a data string of arbitrary size, and then, if necessary, padding the string to the dispersed data storage system's data segment size. In step 504 a transposition cipher is applied to the data segment. While the transposition cipher is trivially reversible if a malicious hacker should gain access to a threshold number of slices, the compromise of a single slice will not yield any consecutive information. In step 506 an information dispersal algorithm is applied to the transposed data segment, and the data slices are then written to different storage nodes of the dispersed data storage system in step 508.

Figure 7:
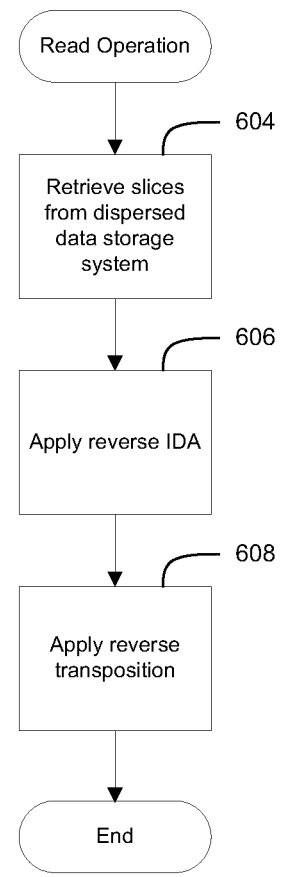
FIG. 7 is a flow chart illustrating a read operation from a dispersed data storage system utilizing a columnar transposition cipher and an information dispersal algorithm.

FIG. 7 depicts the steps required to read data from a dispersed data storage system in accordance with a first embodiment of the disclosed invention. In step 602 a read operation is initiated. In step 604, a threshold number of data slices are retrieved from the dispersed data storage system, where the threshold for a given dispersed data storage system is the minimum number of slices required to reconstruct a stored data segment. In step 406 a reverse information dispersal algorithm is applied to obtain a transposed data segment, and, in step 408 the transposition cipher is reversed to produce a usable data segment.

Figure 8:
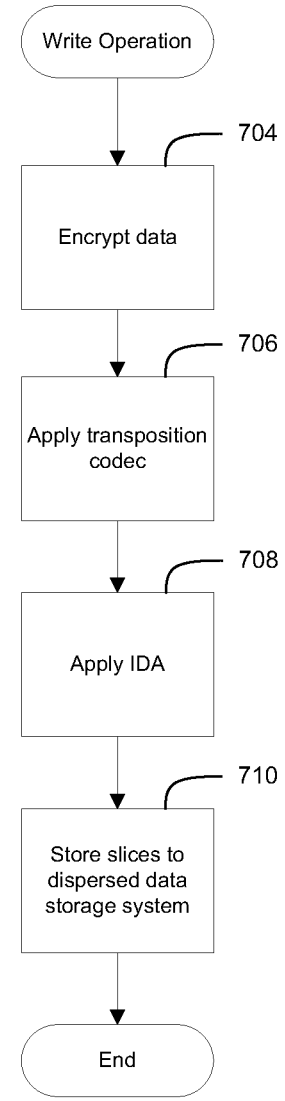
FIG. 8 is a flow chart illustrating a write operation to a dispersed data storage system utilizing encryption, transposition, and an information dispersal algorithm.

FIG. 8 depicts the steps required to write data from an access computer or an integrated client to a dispersed data storage system in accordance with a second embodiment of the disclosed invention. In step 702 a write operation is initiated. The initiation of the write operation involves accepting a data string of arbitrary size, and then, if necessary, padding the string to the dispersed data storage system's data segment size. In step 704, data is encrypted using any suitable block cipher, such as those mentioned earlier in this specification. In step 706 a transposition cipher is applied to the encrypted data segment. The use of the transposition cipher will guarantee that no consecutive data will be stored in any slice, and therefore, even if a malicious hacker should compromise the encryption key, she would still have to assemble a number of slices equal to the dispersed data storage system's threshold prior to gaining access to any usable information.

In step 708 the encrypted and transposed data segment is dispersed using a suitable information dispersal algorithm, such as Cauchy-Reed Solomon. The slices are then stored to different nodes of the dispersed data storage system, such as, for example, slice servers in step 710.

Figure 9:
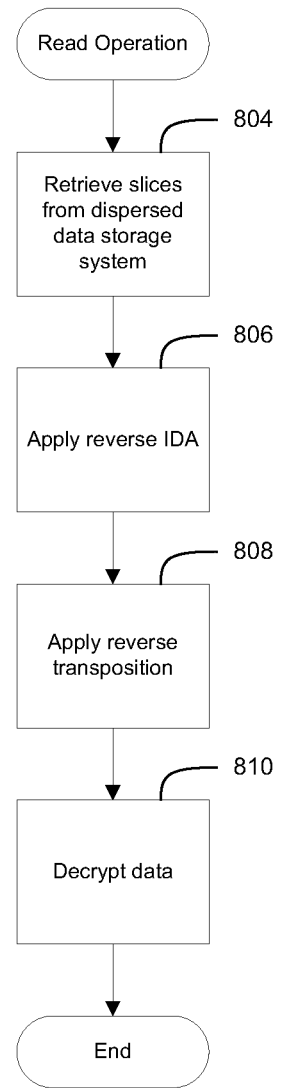
FIG. 9 is a flow chart illustrating a read operation from a dispersed data storage system utilizing encryption, transposition, and an information dispersal algorithm.

FIG. 9 depicts the steps required to read data from a dispersed data storage system in accordance with a second embodiment of the disclosed invention. In step 802 a read operation is initiated. In step 804, a threshold number of data slices are retrieved from the dispersed data storage system, and in step 806 a reverse information dispersal algorithm is applied to obtain a transposed encrypted data segment. In step 808 the transposition cipher is reversed to produce an encrypted data segment, and in step 810 decryption is applied to produce a usable data segment.

Figure 10:
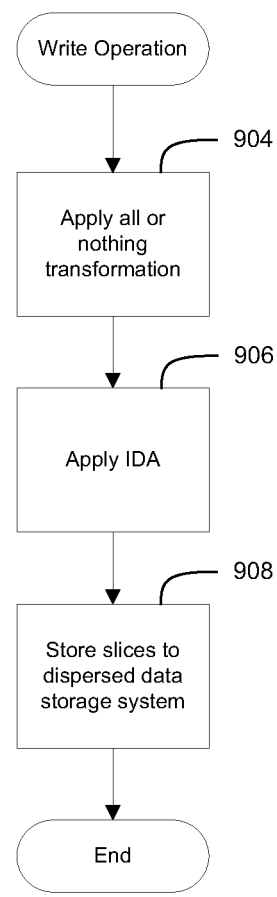
FIG. 10 is a flow chart illustrating a write operation to a dispersed data storage system utilizing an all-or-nothing transformation and an information dispersal algorithm.

FIG. 10 depicts the steps required to write data to a dispersed data storage system in accordance with a third embodiment of the disclosed invention. In step 904, an all-nothing-transformation is applied to a data segment to be stored, thereby producing an all-or-nothing encrypted data segment. The all-or-nothing transformation could be that described earlier in this document, or some other all-or-nothing transformation. In step 906 an information dispersal algorithm is applied to the all-or-nothing encrypted data segment to produce a plurality of data slices, and in step 908, the plurality of data slices is stored to a plurality of storage nodes.

Figure 11:
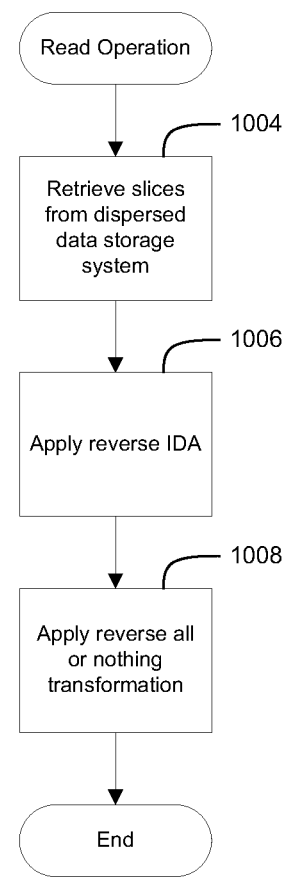
FIG. 11 is a flow chart illustrating a read operation from a dispersed data storage system utilizing an all-or-nothing transformation and an information dispersal algorithm.

FIG. 11 depicts the steps required to read data from a dispersed data storage system in accordance with a third embodiment of the disclosed invention. In step 1004, a plurality of data slices corresponding to a stored data segment are retrieved from a plurality of storage nodes, and a reverse information dispersal algorithm is applied in step 1006. In step 1008, the all-or-nothing transformation is removed by using, for example, the method described earlier in this document, or some other method appropriate to the all-or-nothing transformation to be removed.

Figure 12:
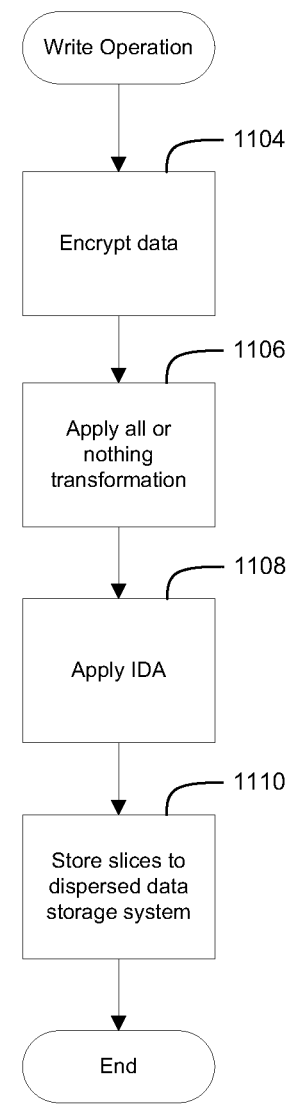
FIG. 12 is a flow chart illustrating a write operation to a dispersed data storage system utilizing encryption, an all-or-nothing transformation, and an information dispersal algorithm.
Figure 13:
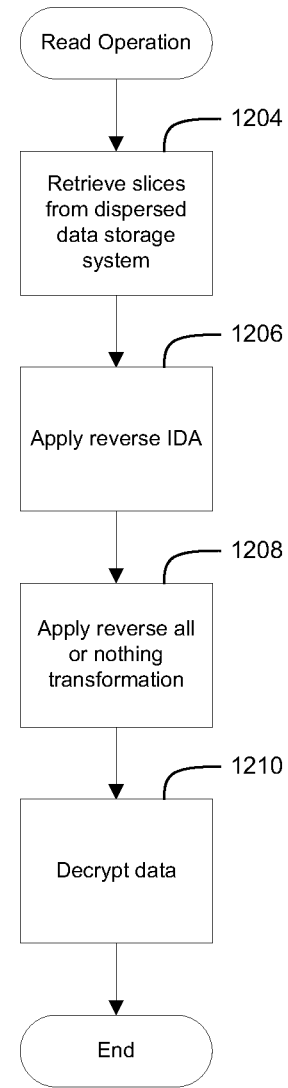
FIG. 13 is a flow chart illustrating a read operation from a dispersed data storage system utilizing encryption, an all-or-nothing transformation, and an information dispersal algorithm.

FIG. 12 depicts the steps required to write data from a dispersed data storage system in accordance with a fourth embodiment of the disclosed invention. In step 1104, a data segment to be stored is encrypted using a block cipher, such as AES, RC4, or any of the block ciphers discussed earlier in this document, thereby producing an encrypted data segment. In step 1106, an all-nothing-transformation is applied to the encrypted data segment to, thereby producing an all-or-nothing encrypted data segment. The all-or-nothing transformation could be that described earlier in this document, or some other all-or-nothing transformation. In step 1108, an information dispersal algorithm is applied to the all-or-nothing encrypted data segment, producing a plurality of data slices, which are stored to a plurality of storage nodes in step 1110. FIG. 13 depicts the steps required to read data from a dispersed data storage system in accordance with a fourth embodiment of the disclosed invention. In step 1204, a plurality of data slices corresponding to a stored data segment is retrieved from a plurality of storage nodes. In step 1206, a reverse information dispersal algorithm is applied, and in step 1208, the all-or-nothing transformation is removed by using, for example, the method described earlier in this document or another appropriate method. Finally, in step 1210, the read data segment is decrypted.

Figure 14:
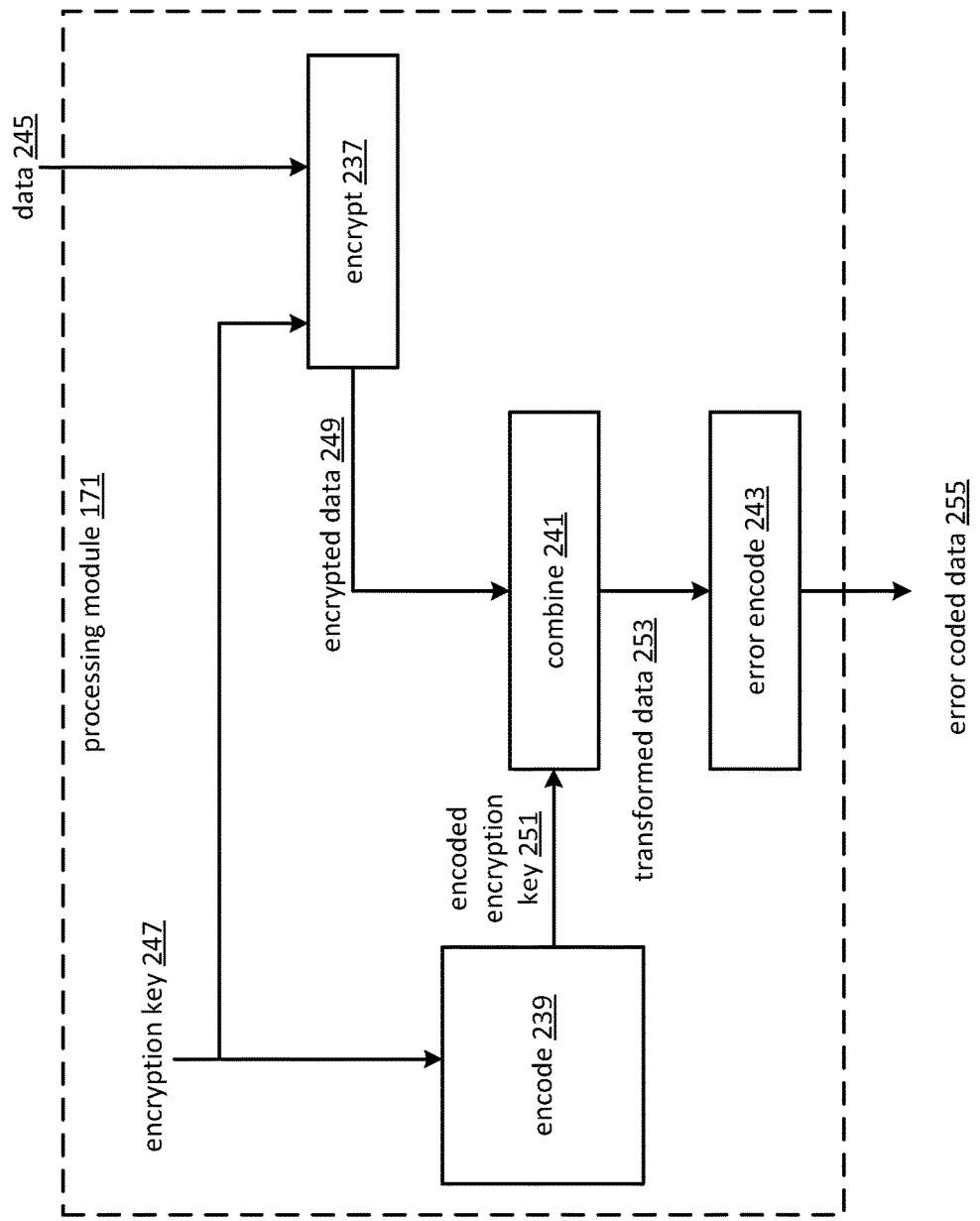
FIG. 14 is a schematic block diagram of an embodiment of a data encryptor and encoder in accordance with the invention.

FIG. 14 is a schematic block diagram of an embodiment of a processing module 171 (e.g., processing module 50 of the DS processing unit 16 and/or of the first type of user device 12) implementing a method to encrypt and error encode data 245, which may be a data file 38 and/or a data block 40 as shown in FIG. 1. The method begins with the processing module 171 encrypting 237 the data 245 with an encryption key 247 to produce encrypted data 249. The encryption may include performing one or more encryption algorithms (e.g., Data Encryption Standard, Advanced Encryption Standard, etc.) and a key generator may generate the encryption key 247. For example, the encryption key 247 may be generated based on one or more of: a random number, a key retrieved from security parameters, the data segment number, a random number generated from a seed retrieved from the security parameters, a portion of the data segment, and/or a key embedded in the data segment. Note that the encryption key 247 may be sixteen (128 bits), thirty two (256 bits), or some other number of bits.

The processing module 171 also encodes 239 the encryption key 247 to produce an encoded encryption key 251. The processing module 171 may due this by executing an error control algorithm, an encryption algorithm, a cyclic redundancy check (e.g., CRC 32), and/or any other transformation that masks the encryption key 247. For example, the processing module 171 may encode the encryption key 247 utilizing a shared secret method as will be discussed in greater detail with reference to FIG. 18. In another example, the processing module 171 may encode the encryption key 247 utilizing the AES algorithm and a private key retrieved from the security parameters. In yet another example, the processing module 171 may perform a hash function on the encrypted data 249 and combine it with the encryption key to encode the encryption key 247.

The processing module 171 then combines the encrypted data 249 and the encoded encryption key 251 to produce transformed data 253. For example, the processing module 171 may combine the encrypted data 249 and the encoded encryption key 251 by appending the encoded encryption key 251 to the encrypted data 249. As another example, the processing module 171 may embed the encoded encryption key 251 into the encrypted data 249. In another example, the processing module 171 creates a first file of the transformed data 253 that contains the encoded encryption key 251 and a second file of the transformed data 253 that contains the encrypted data 249.

The processing module 171 then error encodes 243 the transformed data 253 to produce error coded data 255. The error encoding 243 may error encode a portion of the transformed data 253 by calculating and adding forward error correction bits to the transformed data 253 bits in accordance with an error coding algorithm (e.g., Reed-Solomon, Convolution encoding, Trellis encoding, etc.) to produce error encoded transformed data.

In an embodiment, the error encoding 243 may be done in accordance with a forward error correction scheme that has a failure tolerance of n-k, where k is number of input symbols and n is the number of output symbols. As such, the transformed data 253 may include a plurality of slices, e.g., n slices per data segment. Note that the forward error correction and slicing schemes may have a failure tolerance of n-k slices, where k is the minimum threshold of required slices to re-construct the data segment and n is the number of slices created for each data segment.

Figure 15:
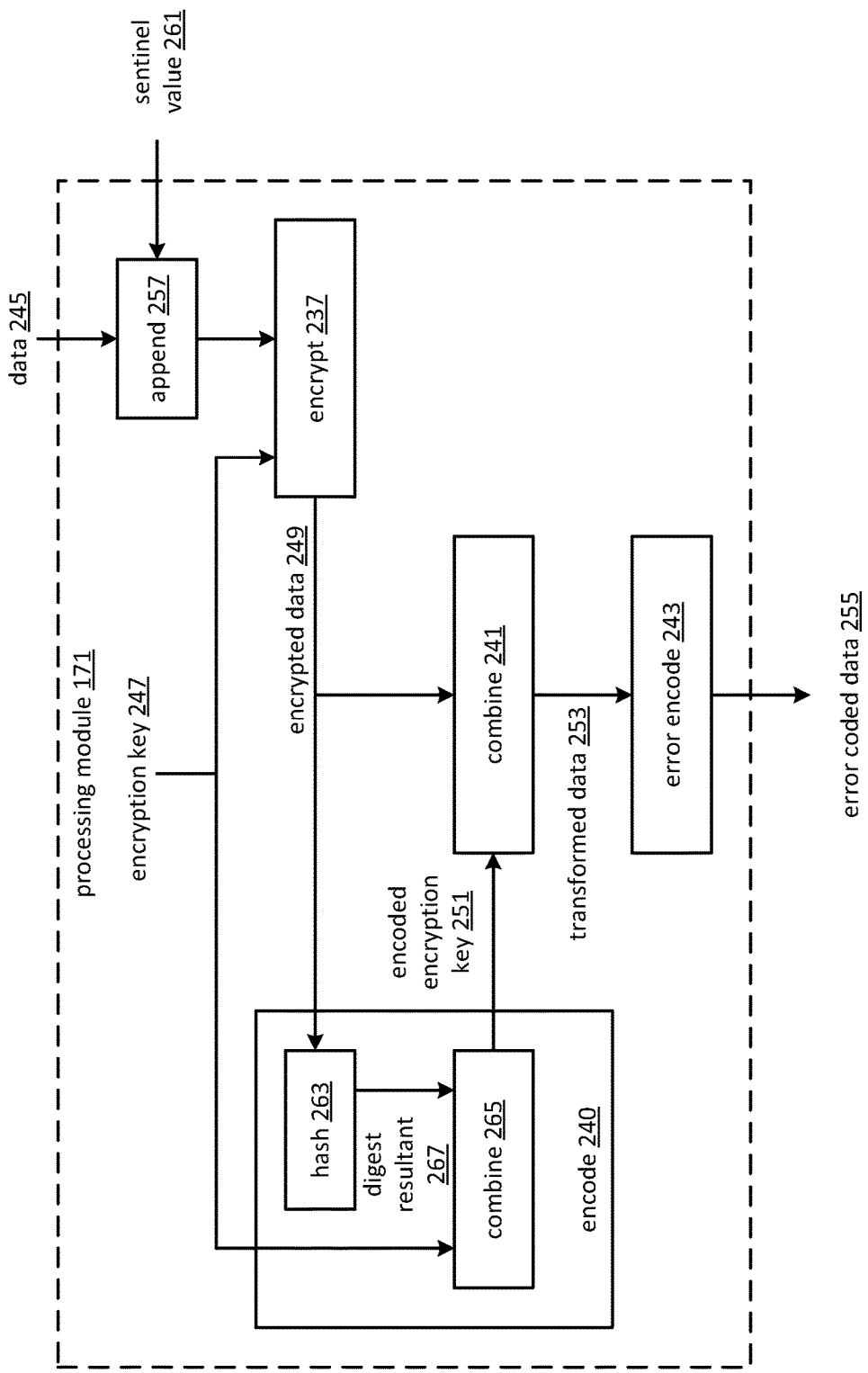
FIG. 15 is a schematic block diagram of another embodiment of a data encryptor and encoder in accordance with the invention.

FIG. 15 is a schematic block diagram of another embodiment a processing module 171 (e.g., processing module 50 of the DS processing unit 16 and/or of the first type of user device 12) implementing a method to encrypt and error encode data 245. The method begins with the processing module 245 appending a sentinel value 261 on the data 245 to produce appended data. In general, the sentinel value 261 provides a convenient mechanism for verifying the accuracy of the recovery of the data 245 during a read operation from the DSN memory. For example, if the sentinel value 261 is accurately recovered during a read operation, then there is a very high probability that the data 245 was also accurately recovered. Note that the sentinel value 261 may be a sixteen byte value (larger or smaller) that may be defined in the security parameters associated with a vault, may be a DSN-wide security parameter, may be a unique number for the given data segment, and/or may be an encrypted number.

The method continues with the processing module 171 encoding the encryption key 247 to produce an encoded encryption key 251. In this embodiment, the encoding function 240 includes a hash function 263 and a combining function 265. The hash function 263 performs a hash function (e.g., hashing with a checksum (e.g., CRC32), a trivial has function, a perfect hashing, a minimal perfect hashing, a uniformly distributed data hash function, variable length data hashing, a cryptographic hashing function, etc.) on the encrypted data 249 to produce a digest resultant 267.

The combining function 265 combines the encryption key 247 and the digest resultant 267 to produce the encoded encryption key 251. The combining function may combine the encryption key 247 and the digest resultant 267 by calculating an exclusive OR (XOR) of the encryption key 247 and the digest resultant 267 or other combining function (e.g., addition, subtraction, logic function, and/or programmed function).

The combining function 241 and the error encoding function 243 function as previously described with reference to FIG. 14 to produce the error coded data 255.

Figure 16:
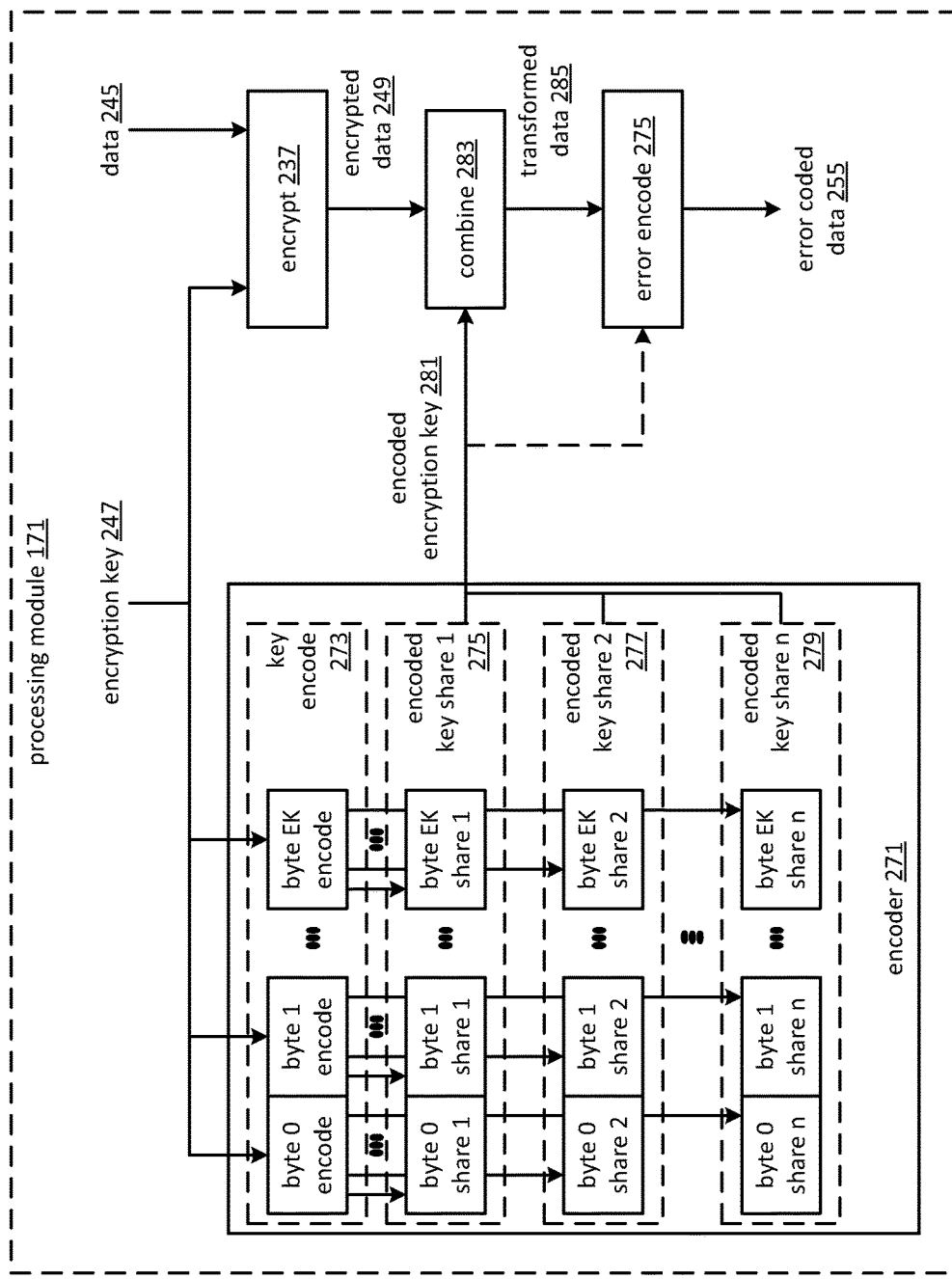
FIG. 16 is a schematic block diagram of another embodiment of a data encryptor and encoder in accordance with the invention.
Figure 17:
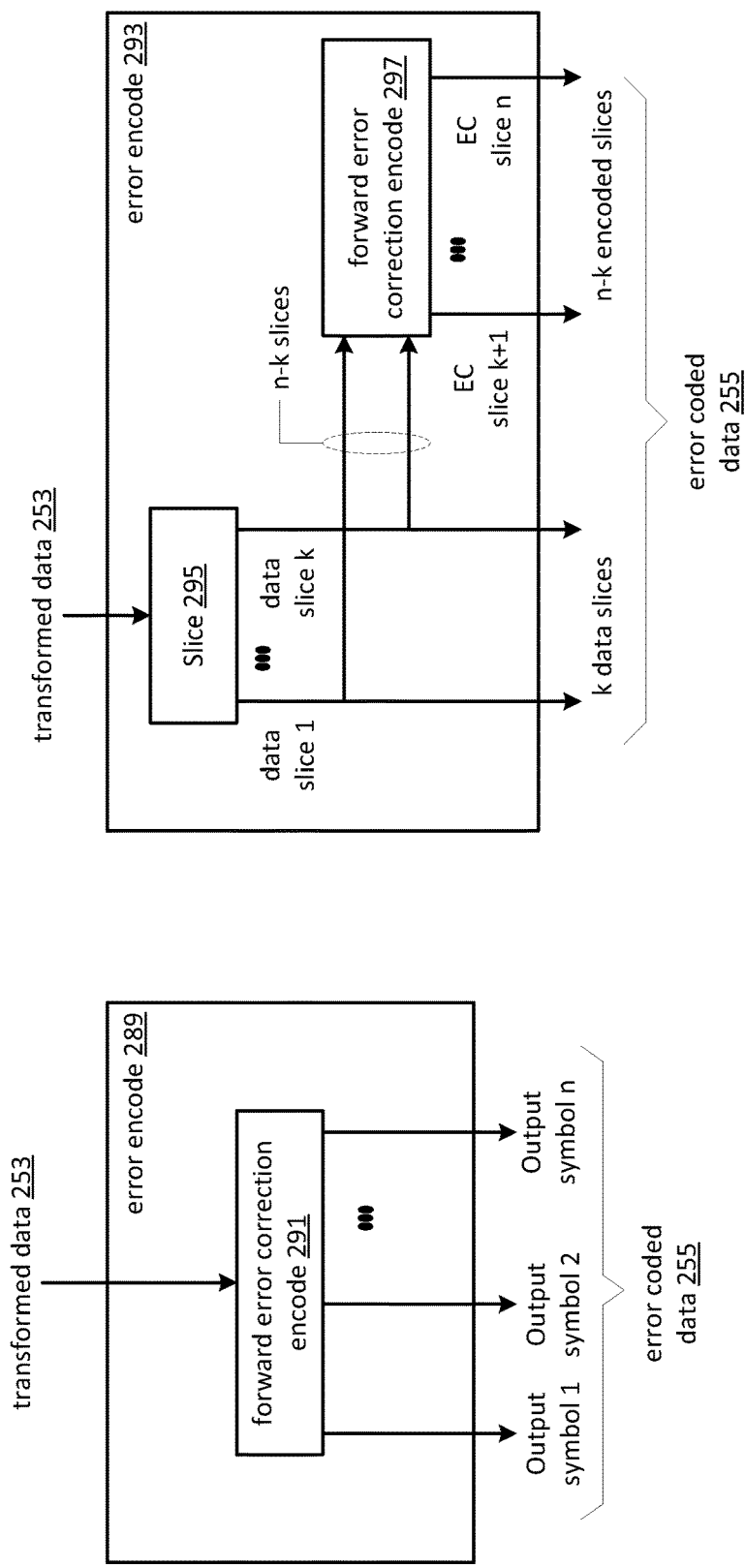
FIG. 17a is a schematic block diagram of an embodiment of an error encoder in accordance with the invention.
FIG. 17b is a schematic block diagram of another embodiment of an error encoder in accordance with the invention.

FIG. 16 is a schematic block diagram of another embodiment of a processing module 171 (e.g., processing module 50 of the DS processing unit 16 and/or of the first type of user device 12) implementing a method to encrypt and error encode data 245, which may be a data file 38 and/or a data block 40 as shown in FIG. 1. The method begins as previously discussed with reference to FIG. 14 with the encryption 237 of the data 245 based on the encryption key.

The method continues with the encoding 271 of the encryption key 247. In this embodiment, the encoding function 271 utilizes a shared secret encoding scheme, such as a Shamir Shared Secret Scheme, to produce the encoded encryption key 281. The shared secret encoding scheme includes a key encode function 273 and a plurality of encoded key share registers 275-279.

The key encoding function 273 may individually encode each byte of the encryption key 247 (e.g., byte 0 to byte EK, where EK-1 matches the number of bytes in the encryption key 247). For instance, the key encoding function 273 may use one or more encoding algorithms to produce a plurality of encoded byte-shares (e.g., byte 0-share 1, byte 1-share 1, ... byte EK-share 1, byte 0-share 2, ..., byte EK-share 2, ..., byte 0-share n, ..., byte EK-share n). The encoding algorithms may include a straight line equation, a quadratic equation, and/or a polynomial equation of an order of three or more. For example, the straight line equation (e.g., y=mx+b) may be used to encode a byte of the encryption key 247, where "m" is the corresponding byte of the encryption key 273 to be encoded (e.g., the secret), "b" is a constant, "x" is the pillar number (e.g., which slice or key share: 1-n), and "y" is resulting encoded byte-share. As such, the resulting encoded byte-shares for byte 0 are byte 0-share 0=byte 0 of the encryption key*pillar 1+b; byte 0-share 1=byte 0 of the encryption key*pillar 2+b; byte 0 of the encryption key*pillar n+b.

Each of the encoded key share registers 275-279 stores a key share of the encoded encryption key 247. For instance, the first encoded key share register 275 stores the encoded byte 0-share 1 through byte EK-share 1 as the first key share. Once the encryption key 247 is encoded, the encoding function 271 outputs the plurality of key shares as the encoded encryption key 281 to the combining function 283 or to the error encoding function 275.

If the secret encoded encryption key 281 is provided to the combining function 283, the combining function 283 and the error encoding function 275 function as previously discussed with reference to FIG. 14 to produce the error coded data 255. If, however, the secret encoded encryption key 281 is provided to the error encoding function 275, the combining function 283 passes the encrypted data 249 to the error encoding function 275 as the transformed data 285. In this instance, the error encoding function error encodes the transformed data to produce error encoded transformed data and appends the key shares thereto to produce the error coded data 255.

FIG. 17a is a diagram of an embodiment of an error encoding module 289 that includes a forward error correction encoding module 291. In this embodiment, the forward error correction encoding module 291 performs a forward error correction scheme (e.g., Reed-Solomon, Convolution encoding, Trellis encoding, etc.) on the transformed data 253 to produce a plurality of output symbols (e.g., error encoded slices), which comprises the error coded data 255. The forward error correction scheme may have a failure tolerance of n-k, where k is number of input symbols (i.e., the threshold number of slices) and n is the number of output symbols (e.g., the number of slices for a given data segment).

FIG. 17b is a schematic block diagram of another embodiment of an error encoding module 293 that includes a slicing module 295 and a forward error correction encoding module 297. The slicing module 295 slices the transformed data 253 (e.g., a data segment with the encoded encryption key appended thereto) into k data slices (e.g., where each of the k slices is an equal portion of the transformed data 253).

The forward error correction encoder 297 error encodes (n-k) data slices of the k data slices to produce (n-k) encoded data slices (e.g., data slice k+1 through data slice n), wherein n is a number of slices of the error coded data 255. In another embodiment, the forward error correction encoder 297 may error encode (n-k) data slices of the transformed data 253 (e.g., prior to slicing by the slicer 295) to produce (n-k) encoded data slices.

The error encoder 293 may output at least some of the (n-k) encoded data slices (e.g., data slice k+1 through data slice n) and the k data slices (e.g., data slice 1 through data slice k) as the error coded data 255 such that the slices are dispersed stored in the DSN memory. Note that the data integrity may be better when all n slices are dispersed stored. Further note that at least k slices may be dispersed stored to enable subsequent retrieval and decoding.

Figure 18:
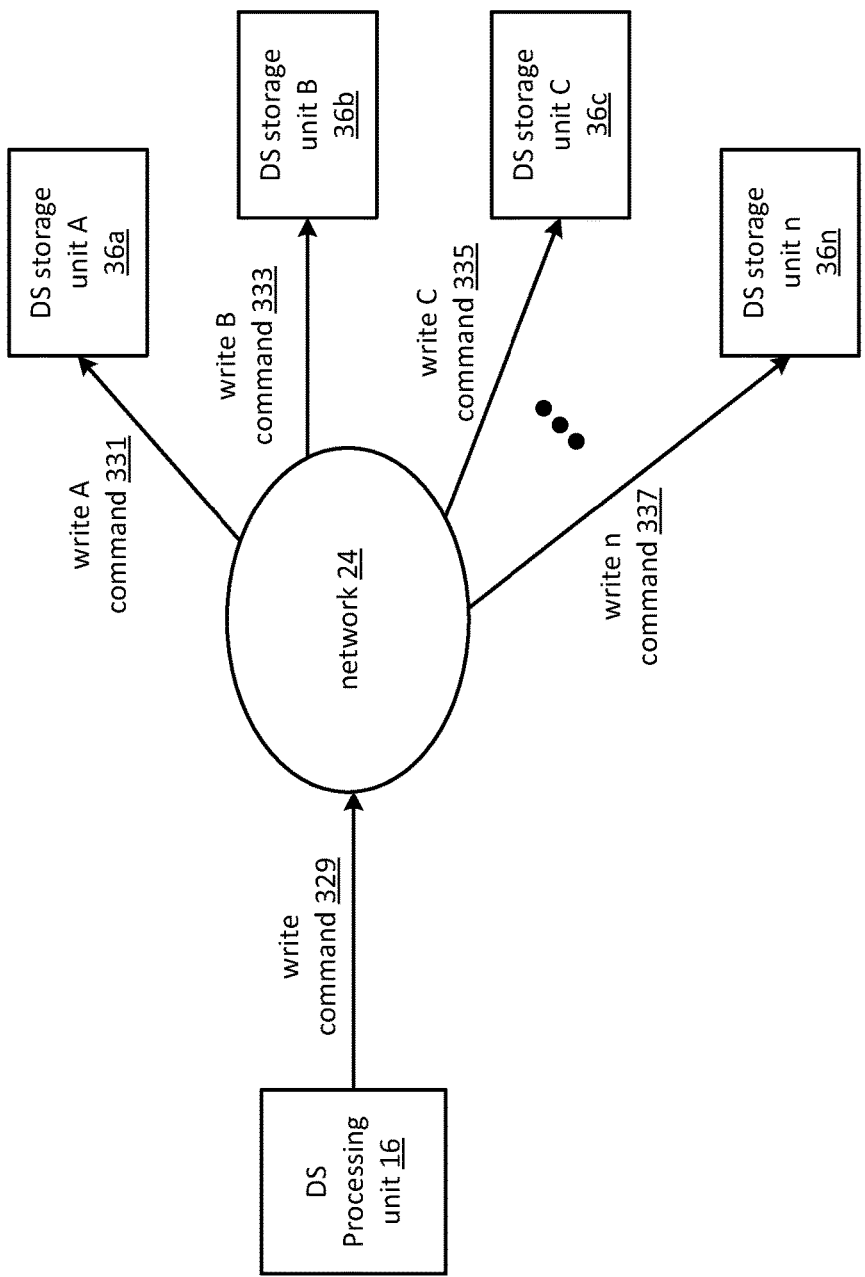
FIG. 18 is a schematic block diagram of another embodiment of a computing system in accordance with the invention.

FIG. 18 is a schematic block diagram of another embodiment of a computing system that includes the DS processing unit 16 (or the first type of user device 12), the network 24, and a plurality of DS units 36a-36n. In this embodiment, the DS processing unit 16 transmits a write commands 329 to the DS units 36a-36n via the network 24. For example, the write command 329 includes a write A command 331, a write B command 333, a write C command 335, and a write D command 337. In particular, the DS processing unit 16 transmits the write A command 331 to DS unit A 36a to command the DS unit A to store the accompanying EC data slice.

Figure 19:
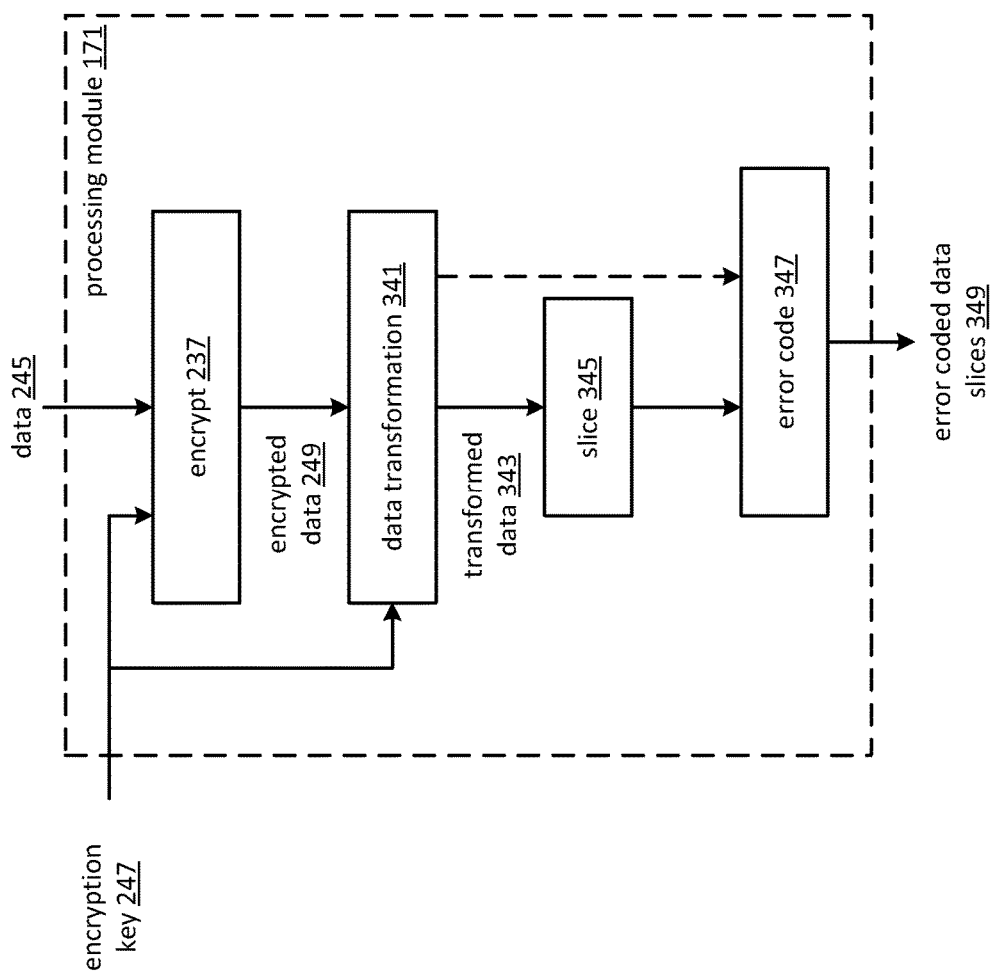
FIG. 19 is a schematic block diagram of another embodiment of a data encryptor and encoder in accordance with the invention.

FIG. 19 is a schematic block diagram of another embodiment of the processing module 171 (e.g., processing module 50 of the DS processing unit 16 and/or of the first type of user device 12) implementing a method to encrypt and error encode data 245, which may be a data file 38 and/or a data block 40 as shown in FIG. 1. The method begins with the processing module 171 encrypting 237 the data 245 via an encryption key 247 to produce encrypted data 249 as previously discussed with reference to FIG. 14.

The method continues with the processing module 171 performing a data transformation function 341 on the encrypted data 249 and the encryption key 247 in accordance with a transformation scheme to produce transformed data 343. The transformation scheme may include appending a manipulated version of the encryption key 247 to the encrypted data 249. For example, data transformation module 341 may manipulate the encryption key 247 by XOR the encryption key 247 with a digest resultant. Generation of a digest resultant was previously discussed with referenced to FIG. 15.

The slice function 345 slices the transformed data 343 into a plurality of data slices. For example, the slice function 345 may slice the transformed data 343 into a plurality of data slices (e.g., n or k slices that are an equal portion of the transformed data 343). The slice function 345 sends the slices to the error coding function 347.

The error coding function 347 error codes at least some of the plurality of data slices to produce a plurality of error coded data slices. In an embodiment, the error coding function 347 error encodes (n-k) of the error coded data slices 349 of k data slices (e.g., after slicing by the slicer 345) to produce (n-k) of the error coded data slices 349.

In another embodiment, the error encoding function 347 error encodes a portion of the transformed data 343 by calculating and adding forward error correction bits to the transformed data 343 bits in accordance with an error coding algorithm (e.g., Reed-Solomon, Convolution encoding, Trellis encoding, etc.) to produce error encoded transformed data. For example, the error coding function 347 error encodes (n-k) of the error coded data slices 349 of the transformed data 343 (e.g., prior to slicing by the slicer 345) to produce (n-k) of the error coded data slices 349.

Figure 20:
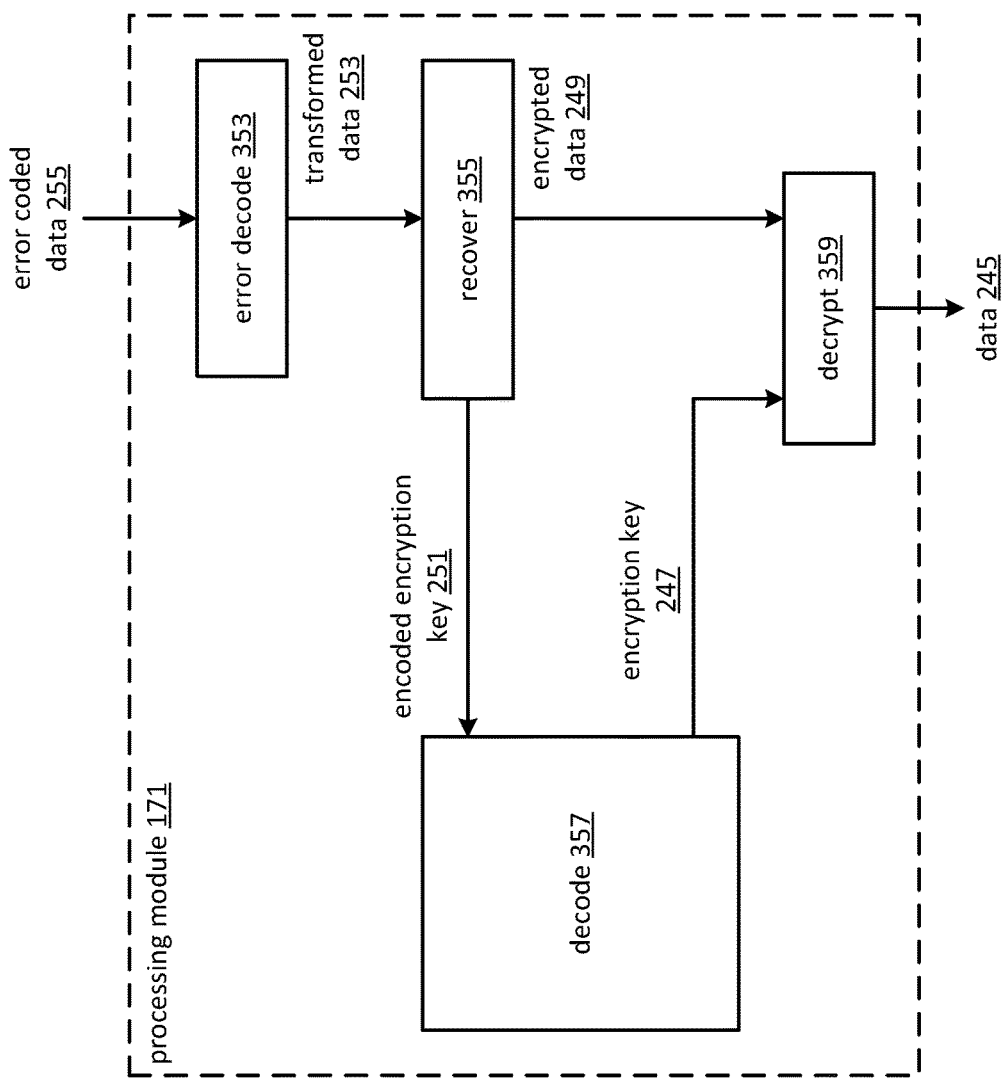
FIG. 20 is a schematic block diagram of an embodiment of an error decoder and decryptor in accordance with the invention.

FIG. 20 is a schematic block diagram of an embodiment of a processing module 171 (e.g., processing module 50 of the DS processing unit 16 or processing module 50 of the first type of user device 12) performing a method to error decoder and decrypt error coded data 255. The method begins with the processing module 171 error decoding 353 the error coded data 255 in accordance with an error coding algorithm (e.g., Reed-Solomon, Convolution encoding, Trellis encoding, etc.) to produce transformed data 253. As such, the error decoding function 353 is performing a complimentary decoding function to the error encoding function 243, 275, and/or 347 as described with reference to one or more of FIGS. 14-19.

The method continues with the processing module 171 performing a recovery function 355 to recover encrypted data 249 and the encoded encryption key 251 from the transformed data 253. In this embodiment, the recovery function 355 is implementing a complimentary function of the combining function 241 and/or 281 as described with reference to one or more of FIGS. 14-19 or the complimentary function of the data transform function 341 of FIG. 19.

The method continues with the processing module 171 performing a decoding function 357 to decode the encoded encryption key 251 to recover the encryption key 247. In this embodiment, the decoding function 357 is performing a complimentary function to the encoding function 239, 240, and/or 271 as described with reference to one or more of FIGS. 14-19.

The method continues with the processing module 171 performing a decrypt function 359 to decrypt the encrypted data 249 using the encryption key 247 to recover data 245. In this embodiment, the decrypt function 359 is performing a complimentary function to the encrypt function 237 as described with reference to one or more of FIGS. 14-19.

Figure 21B:
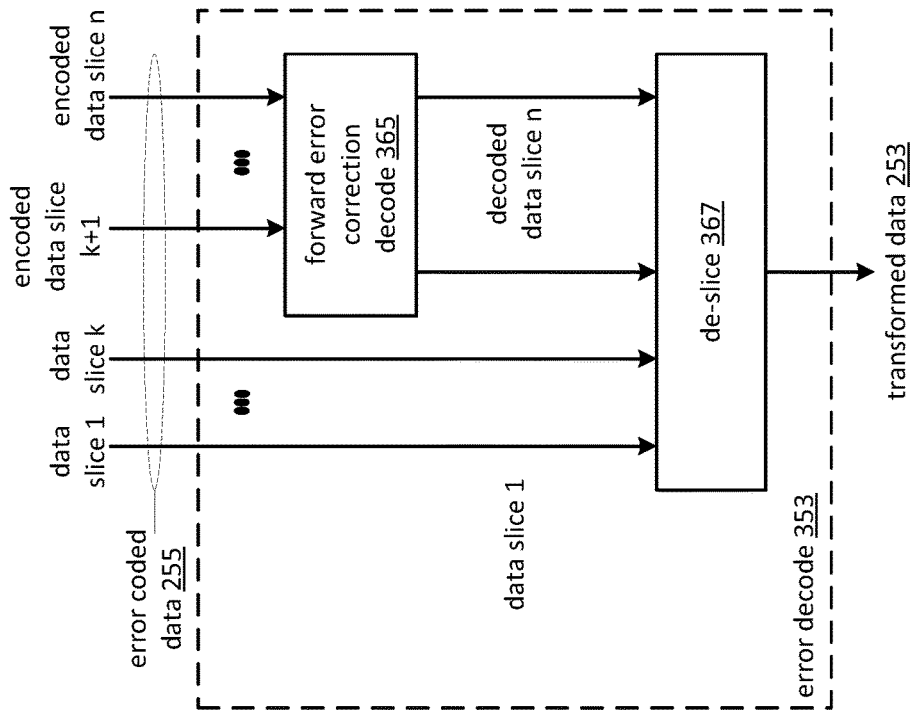
FIG. 21b is a schematic block diagram of another embodiment of an error decoder in accordance with the invention.
Figure 21A:
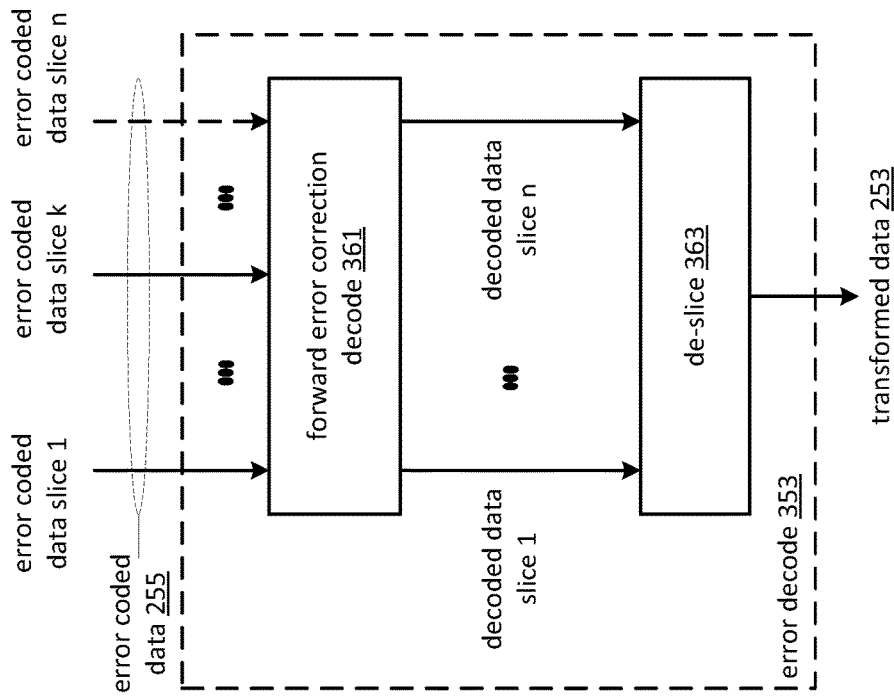
FIG. 21a is a schematic block diagram of an embodiment of an error decoder in accordance with the invention.

FIG. 21a is a schematic block diagram of an embodiment of an error decoding function 353 that includes a forward error correction decode module 361 and a de-slice module 363. The forward error correction decoding module 361 receives at least k (e.g., a threshold) error coded data slices of as many as n error coded data slices from the DSN memory as the error coded data 255. Upon receiving at least k slices, the forward error correction decoding 361 decodes the at least k number of error coded data slices using a forward error correction scheme having a failure tolerance of n-k to produce n decoded data slices (e.g., 1-n) of the transformed data 253. The de-slicing function 363 de-slices the decoded data slices to produce the transformed data 253.

FIG. 21b is a schematic block diagram of another embodiment of an error decoding function 353 that includes a forward error correction decoding function 365 and a de-slicing function 367. The forward error correction decoding function 365 receives (n-k) encoded data slices for decoding as previously discussed. The n-k decoded slices are provided to the de-slicing module 3367. The de-slicing module 367 also receives the first k slices, such that in receives a total of n slices. The de-slicing module 367 de-slices the n slices to produce the transformed data 253.

Figure 22:
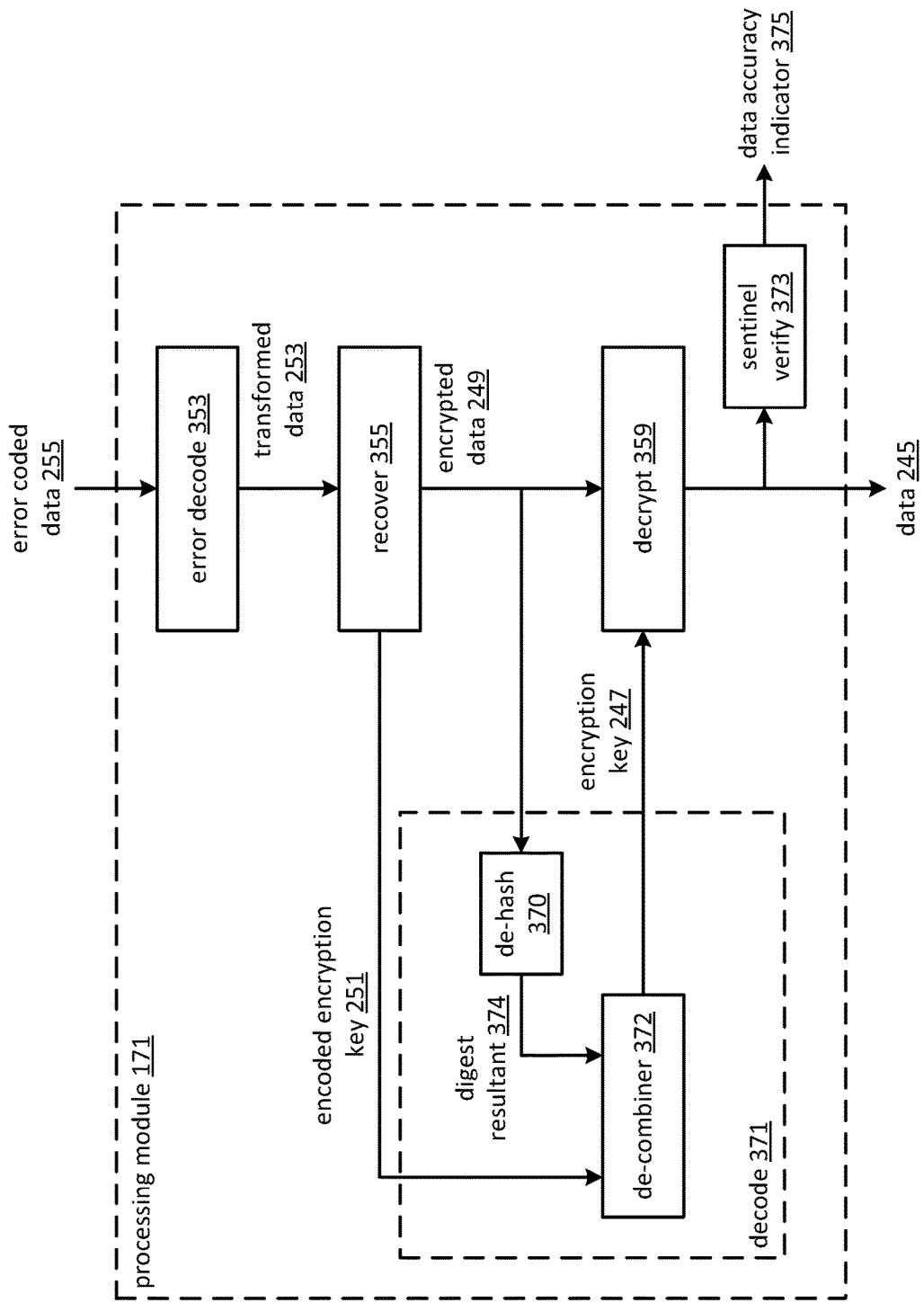
FIG. 22 is a schematic block diagram of another embodiment of an error decoder and decryptor in accordance with the invention.

FIG. 22 is a schematic block diagram of another embodiment of a processing module 171 (e.g., processing module 50 of the DS processing unit 16 or processing module 50 of the first type of user device 12) performing a method to error decoder and decrypt error coded data 255. The method begins with the processing module 171 error decoding 353 the error coded data 255 as previously discussed with reference to FIG. 19. The method continues with the processing module recovering 355 the encrypted data 249 and the encoded encryption key 251 as previously discussed with reference to FIG. 19.

The method continues with the processing module 171 decoding the encoded encryption key 251. In this embodiment, the decoding function 371 includes a de-hash function 370 and a de-combine function 372. The de-hashing function 370 performs a complimentary hash function to the hash function performed by the hash module 263 of FIG. 15 to generate a digest resultant 374 from the encrypted data 249. For example, the de-hashing function may be one or more of hashing with a checksum (e.g., CRC32), a trivial has function, a perfect hashing, a minimal perfect hashing, a uniformly distributed data hash function, variable length data hashing, a cryptographic hashing function, etc.

The de-combining function 372 recovers the encryption key 247 from the encoded encryption key 251 based on the digest resultant 274. In an embodiment, the de-combining function 372 de-combines the encoded encryption key 251 by exclusive ORing it with the digest resultant 267.

The method continues with the processing module decrypting 359 the encrypted data 249 based on the encryption key 247 as previously discussed. The method continues with the processing module 171 verifying 373 the accuracy of the recovery of the sentinel value 373 that was appended to the data 245. The recovered sentinel value may be verified by comparing it with an known sentinel value (e.g., a stored sentinel value, a value contained in the security parameters associated with a vault, a DSN-wide security parameter, a unique number associated with each data segment, and/or an encrypted number). If the sentinel value was accurately recovered, the processing module 171 generates an indication 375 that the data was accurately recovered.

Figure 23:
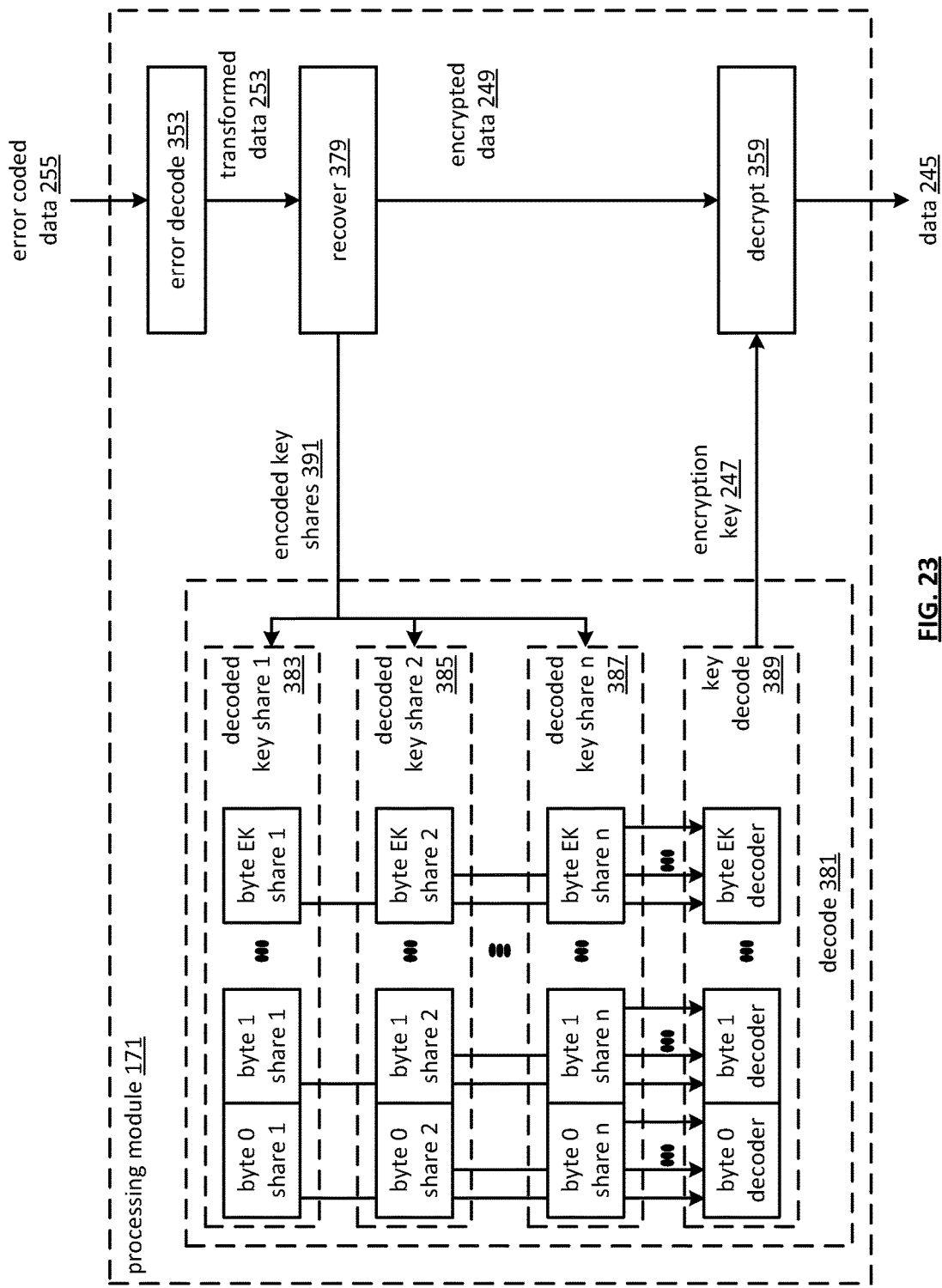
FIG. 23 is a schematic block diagram of another embodiment of an error decoder and decryptor in accordance with the invention.

FIG. 23 is a schematic block diagram of another embodiment of a processing module 171 (e.g., processing module 50 of the DS processing unit 16 or processing module 50 of the first type of user device 12) performing a method to error decoder and decrypt error coded data 255. The method begins with the processing module 171 error decoding 353 the error coded data 255 as previously discussed with reference to FIG. 19. The method continues with the processing module recovering 355 the encrypted data 249 and the encoded encryption key 251 as previously discussed with reference to FIG. 19.

The method continues with the processing module 171 decoding the encoded encryption key 251. In this embodiment, the decoding function 371 performs the decoding of a secret sharing scheme (e.g., decoding of a Shamir secret sharing scheme). The decoding function 371 includes a plurality of decode key share registers 383-387 to store a plurality of secret share portions, which collectively represented the encoded encryption key. For example a first decode key share register 383 may include EK−1 bytes (e.g., byte 0 share 1 through byte EK share 1) of caching for a first slice of a key share; a second decode key share 2 385 may include EK−1 bytes (e.g., byte 0 share 2 through byte EK share 2); etc.

The decoding function 381 also includes a key decode function 389 to decode the plurality of encoded key shares 391 using a secret sharing scheme to recover the encryption key 247. The key decode 389 may include EK−1 decode modules (e.g., byte 0 decoder through byte EK decoder) corresponding to the number of bytes of the encryption key 247. Each decode module may receive the corresponding byte from the n key shares to decode that byte of the encryption key 247. For example, byte 0 decoder may decode byte 0 of the encryption key 247 from byte 0 share 1 (byte 0 of encoded key share 1 383), byte 0 share 2 (byte 0 of encoded key share 2 385) and so forth in a similar fashion up to byte 0 share n (byte 0 of encoded key share n 387).

The decoding performed by the key decoding function 389 may be a finite field arithmetic function. For example, the decoding function may utilize a straight line equation of the form $y=mx+b$ for byte 1 based on the user vault. The byte 1 decoder of key decoders 389 may solve for m as the encryption key 247 byte 1 (e.g., the secret), and solve for the constant b, while utilizing the pillar number (e.g., which slice or key share 1 through n) as x, and when utilizing y as the byte received from two or more of the encoded key shares 383-387. In another example, the encoder may determine to utilize an equation of the form $y=ax^2+bx+c$ based on the user vault.

The decryptor 359 decrypts the encrypted data 249 using the encryption key 247 to recover data 245 as previously discussed.

Figure 24:
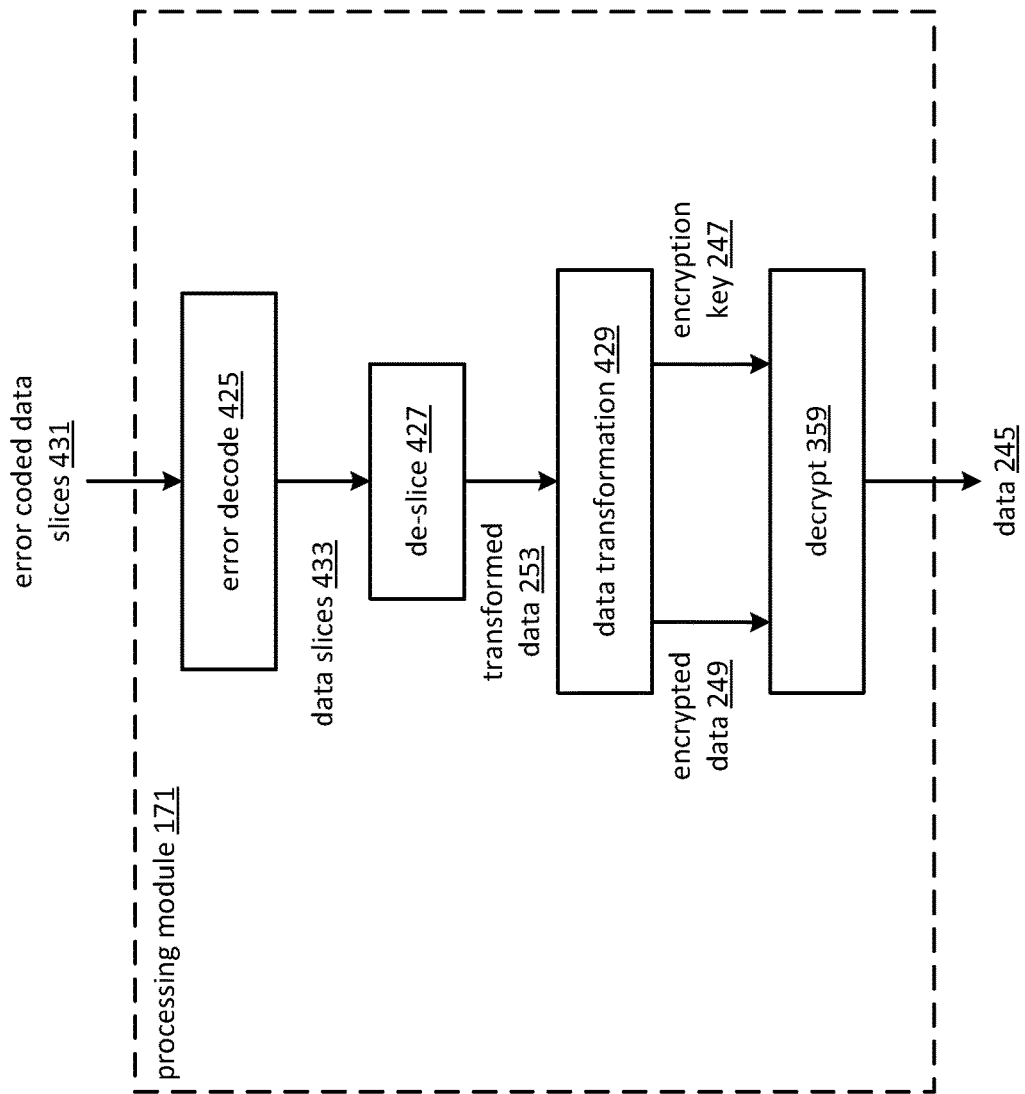
FIG. 24 is a schematic block diagram of another embodiment of an error decoder and decryptor in accordance with the invention.

FIG. 24 is a schematic block diagram of another embodiment of a processing module 171 (e.g., processing module 50 of the DS processing unit 16 or processing module 50 of the first type of user device 12) performing a method to error decoder and decrypt error coded data slices 431. The method begins with the processing module 171 error decoding 425 the error coded data slices 431 as previously discussed with reference to FIG. 19 to produce a plurality of data slices 433. The method continues with the processing module de-slicing 427 the plurality of data slices 433 to produce transformed data 253. Note that the first k slices may constitute the transformed data 253 and the remaining n-k slices may be the error correction data in one instance of the utilization of the Reed-Solomon algorithm.

The data transformation module 429 recovers the encrypted data 249 and the encryption key 247 from the transformed data 253 based on a transformation scheme. The transformation scheme may include the data transformation module 429 de-appending a manipulated version of the encryption key 247 from the transformed data 253 where the manipulated version of the encryption key 247 is then converted by the data transformation module 429 into the encryption key 247. For example, data transformation module 429 may convert the key by performing a XOR of a hash of the encrypted data 249 and the manipulated version of the encryption key 247 to produce the encryption key 249. The data transformation module 429 may perform the hash by calculating the CRC32 of the encrypted data 249.

The decrypt module 359 decrypts the encrypted data 249 using the encryption key 247 to recover data 245 as previously discussed.

Figure 25:
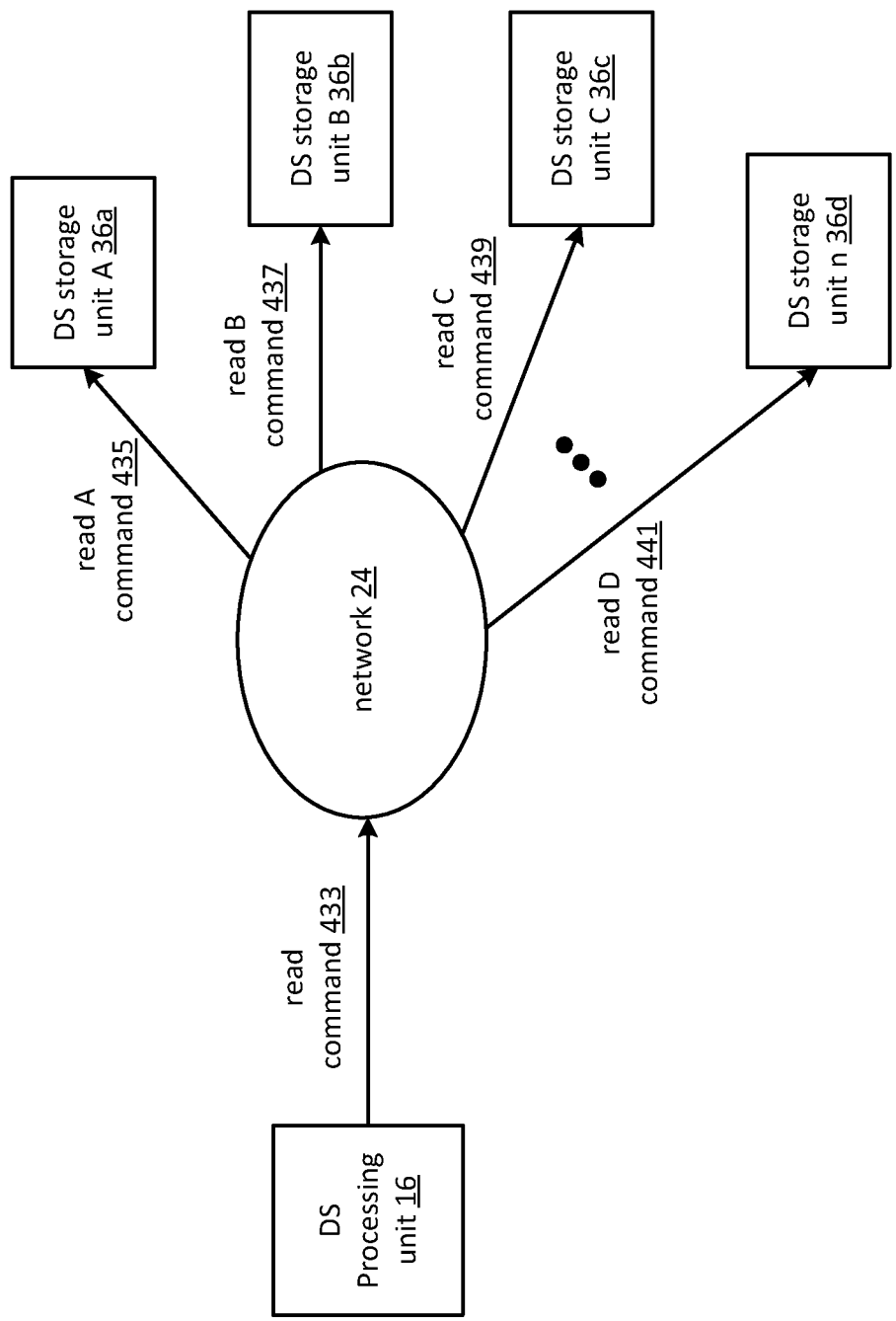
FIG. 25 is a schematic block diagram of another embodiment of a computing system in accordance with the invention.

FIG. 25 is a schematic block diagram of another embodiment of a computing system that includes the DS processing unit 16, the network 24, and a plurality of DS units 36a-36d. In this embodiment, the DS processing unit 16 may send a read command 433 to the DS units 36a-36d. The read command 433 may include a read A command 435, a read B command 437, a read C command 439, and a read D command 441. The DS processing unit 16 sends the read A command 435 to DS unit A 36a; the read B command 437 to DS unit B 36b; the read C command 439 to DS unit C 36c; and the read D command 441 to DS unit n 36d. Each of the DS units 36a-36d processes its respective read command to retrieve one or more stored EC slices of a data file and/or data block.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a processing module, the method comprises:
   receiving, via a network interface, error coded data;
   decoding the error coded data using an error coding scheme to produce transformed data;
   partitioning the transformed data into an encoded encryption key for decoding encrypted data included in the transformed data and the encrypted data;
   performing a hash function on the encrypted data to produce a digest resultant;
   combining the digest resultant with the encoded encryption key to generate combined key data;
   decoding the combined key data to recover an encryption key; and
   decrypting the encrypted data using the encryption key to recover data.

2. The method of claim 1, wherein the decoding the error coded data by the processing module further comprises:
   receiving at least k number of error coded data slices; and
   error decoding the at least k number of error coded data slices using a forward error correction scheme having a failure tolerance of n–k to produce n decoded data slices of the transformed data.

3. The method of claim 1, wherein the decoding the error coded data by the processing module further comprises:
   receiving at least k of (n–k) encoded data slices and k data slices as the error coded data;
   error decoding at least k of the (n–k) data slices and the k data slices to produce n decoded data slices, wherein k is a threshold number; and
   de-slicing the n decoded data slices to produce the transformed data.

4. The method of claim 1, wherein the decoding the encoded encryption key by the processing module further comprises:
   decoding a plurality of encoded key shares of the encoded encryption key using a secret sharing scheme to recover the encryption key.

5. The method of claim 1 further comprises, for execution by the processing module:
   extracting a sentinel value from the data;
   verifying accuracy of the sentinel value; and
   when the sentinel value is accurate, indicating that the data is accurate.

6. A computing device comprises:
   a processing module;
   memory operably coupled to the processing module; and
   an input/output (TO) port operably coupled to receive error coded data, wherein the processing module is operably coupled to:
      decode the error coded data using an error coding scheme to produce transformed data;
      partition the transformed data into an encoded encryption key for decoding encrypted data included in the transformed data and the encrypted data;
      perform a hash function on the encrypted data to produce a digest resultant;
      combine the digest resultant with the encoded encryption key to generate combined key data;
      decode the combined key data to recover an encryption key; and
      decrypt the encrypted data using the encryption key to recover data.

7. The computing device of claim 6 further comprises:
   the IO port operably coupled to receive at least k number of error coded data slices; and
   the processing module operably coupled to error decode the at least k number of error coded data slices using a forward error correction scheme having a failure tolerance of n–k to produce n decoded data slices of the transformed data.

8. The computing device of claim 6 further comprises:
   the IO port operably coupled to receive at least k of (n–k) encoded data slices and the k data slices as the error coded data; and
   the processing module operably coupled to:
      error decode at least k of the (n–k) data slices and the k data slices to produce n decoded data slices, wherein k is a threshold number; and
      de-slice the n decoded data slices to produce the transformed data.

9. The computing device of claim 6, wherein the processing module further functions to decode the encoded encryption key by:
   decoding a plurality of encoded key shares of the encoded encryption key using a secret sharing scheme to recover the encryption key.

10. The computing device of claim 6, wherein the processing module further functions to:
    extract a sentinel value from the data;
    verify accuracy of the sentinel value; and
    when the sentinel value is accurate, indicate that the data is accurate.

* * * * *